US009055317B2

(12) United States Patent
Cho et al.

(10) Patent No.: US 9,055,317 B2
(45) Date of Patent: *Jun. 9, 2015

(54) MEDIA CONTENT CATALOG SERVICE

(71) Applicant: Microsoft Corporation, Redmond, WA (US)

(72) Inventors: Wei Wei Ada Cho, Issaquah, WA (US); Stephen R. Husak, Snoqualmie, WA (US); Liang Ge, Duvall, WA (US); Aamer Hydrie, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,322

(22) Filed: Oct. 7, 2013

(65) Prior Publication Data
US 2014/0040956 A1 Feb. 6, 2014

Related U.S. Application Data

(63) Continuation of application No. 13/099,914, filed on May 3, 2011, now Pat. No. 8,555,317, which is a continuation of application No. 11/461,589, filed on Aug. 1, 2006, now Pat. No. 7,962,937.

(51) Int. Cl.
*H04N 21/2665* (2011.01)
*H04N 21/84* (2011.01)
*H04N 21/462* (2011.01)
*H04N 7/173* (2011.01)
*H04N 21/262* (2011.01)
*H04N 21/266* (2011.01)

(52) U.S. Cl.
CPC .......... *H04N 21/2665* (2013.01); *H04N 21/84* (2013.01); *H04N 21/4622* (2013.01); *H04N 21/462* (2013.01); *H04N 7/17318* (2013.01); *H04N 21/26283* (2013.01); *H04N 21/26291* (2013.01); *H04N 21/26603* (2013.01)

(58) Field of Classification Search
None
See application file for complete search history.

(56) References Cited

U.S. PATENT DOCUMENTS

| 5,291,554 | A | 3/1994 | Morales |
| 5,721,832 | A | 2/1998 | Westrope et al. |
| 5,774,170 | A | 6/1998 | Hite et al. |
| 5,838,314 | A | 11/1998 | Neel et al. |
| 6,003,041 | A | 12/1999 | Wugofski |
| 6,119,098 | A | 9/2000 | Guyot et al. |
| 6,211,869 | B1 | 4/2001 | Loveman et al. |

(Continued)

FOREIGN PATENT DOCUMENTS

| WO | 01/77897 A2 | 10/2001 |
| WO | 03/065219 A1 | 8/2003 |

OTHER PUBLICATIONS

Smith et al., "Visually Searching the Web for Content," IEEE Multimedia, Jul.-Sep. 199, pp. 12-20, IEEE, USA.

(Continued)

*Primary Examiner* — Justin Shepard
(74) *Attorney, Agent, or Firm* — Bryan Webster; Kate Drakos; Micky Minhas

(57) ABSTRACT

Aggregating media content catalog data from a plurality of content providers. The catalog data is merged according to rules and provided to a user on a scheduled basis or on demand. In an embodiment, the merged catalog data represents an incremental update to previously delivered catalog data.

19 Claims, 9 Drawing Sheets

(56) References Cited

U.S. PATENT DOCUMENTS

| | | |
|---|---|---|
| 6,463,444 B1 | 10/2002 | Jain et al. |
| 6,463,468 B1 | 10/2002 | Buch et al. |
| 6,490,001 B1 | 12/2002 | Shintani et al. |
| 6,567,980 B1 | 5/2003 | Jain et al. |
| 6,698,020 B1 | 2/2004 | Zigmond et al. |
| 6,732,366 B1 | 5/2004 | Russo |
| 6,766,526 B1 | 7/2004 | Ellis |
| 6,910,191 B2* | 6/2005 | Segerberg et al. ............ 715/830 |
| 6,992,728 B2* | 1/2006 | Takagi et al. ................. 348/569 |
| 6,993,553 B2 | 1/2006 | Kaneko et al. |
| 7,003,478 B1 | 2/2006 | Choi |
| 7,210,159 B2 | 4/2007 | Roop et al. |
| 2001/0014876 A1 | 8/2001 | Miyashita |
| 2001/0042249 A1 | 11/2001 | Knepper et al. |
| 2002/0023164 A1 | 2/2002 | Lahr |
| 2002/0073033 A1 | 6/2002 | Sherr et al. |
| 2002/0097979 A1 | 7/2002 | Lowthert et al. |
| 2002/0157098 A1* | 10/2002 | Zustak et al. .................... 725/51 |
| 2002/0178443 A1 | 11/2002 | Ishii |
| 2002/0178449 A1 | 11/2002 | Yamamoto et al. |
| 2003/0037068 A1 | 2/2003 | Thomas et al. |
| 2003/0077067 A1 | 4/2003 | Wu et al. |
| 2003/0110490 A1 | 6/2003 | Dew et al. |
| 2003/0167318 A1 | 9/2003 | Robbin et al. |
| 2003/0177490 A1 | 9/2003 | Hoshino et al. |
| 2003/0182310 A1* | 9/2003 | Charnock et al. .......... 707/104.1 |
| 2003/0233653 A1 | 12/2003 | Hwang et al. |
| 2003/0237093 A1 | 12/2003 | Marsh |
| 2004/0006606 A1 | 1/2004 | Marotta et al. |
| 2004/0030615 A1 | 2/2004 | Ling |
| 2004/0068739 A1 | 4/2004 | Russ et al. |
| 2004/0086120 A1 | 5/2004 | Akins, III et al. |
| 2004/0193609 A1* | 9/2004 | Phan et al. ...................... 707/10 |
| 2004/0268386 A1 | 12/2004 | Logan et al. |
| 2005/0152686 A1 | 7/2005 | Takashimizu et al. |
| 2005/0198006 A1 | 9/2005 | Boicey et al. |
| 2005/0262528 A1 | 11/2005 | Herley et al. |
| 2005/0278230 A1 | 12/2005 | Shirasaka et al. |
| 2006/0008256 A1 | 1/2006 | Khedouri et al. |
| 2006/0059095 A1 | 3/2006 | Akins, III et al. |
| 2006/0085816 A1 | 4/2006 | Funk et al. |
| 2006/0094406 A1 | 5/2006 | Cortegiano |
| 2006/0167903 A1 | 7/2006 | Smith et al. |
| 2006/0212347 A1 | 9/2006 | Fang et al. |
| 2006/0259926 A1* | 11/2006 | Scheelke et al. ................ 725/48 |
| 2007/0002175 A1 | 1/2007 | Narushima et al. |
| 2007/0061842 A1 | 3/2007 | Walter et al. |
| 2007/0083894 A1* | 4/2007 | Gonsalves et al. .............. 725/46 |
| 2007/0124201 A1 | 5/2007 | Hu et al. |
| 2007/0136742 A1 | 6/2007 | Sparrell |
| 2007/0288963 A1 | 12/2007 | Ahmad-Taylor et al. |
| 2008/0028101 A1 | 1/2008 | Dewa |

OTHER PUBLICATIONS

Unknown, "Welcome to CSA, your Guide to Discovery," CSA Illumina, 2006, 1 page, CSA, USA.

Unknown, "AVCataloger Overview," NC Software Inc., 2006, 3 pages, USA.

Unknown, "Your 24-7 Video Store," Apple iTunes, printed from http://www.apple.com/itunes/videos, printed on Jul. 10, 2006, 3 pages, Apple Computer, Inc., USA.

Unknown, "Google to Launch Video Marketplace," Google Press Center, Jan. 6, 2006, Google, Inc., printed from http://www.google.com/press/pressrel/video_marketplace.html, printed on Jul. 10, 2006, 3 pages, USA.

* cited by examiner

US 9,055,317 B2

MEDIA CONTENT CATALOG SERVICE

CROSS-REFERENCE TO RELATED APPLICATIONS

This application is a continuation of U.S. patent application Ser. No. 13/099,914, filed May 3, 2011 (issued on Oct. 8, 2013 as U.S. Pat. No. 8,555,317), which is a continuation of U.S. patent application Ser. No. 11/461,589, filed Aug. 1, 2006 (issued on Jun. 14, 2011 as U.S. Pat. No. 7,962,937), the entire contents of which are incorporated herein by reference.

BACKGROUND

Consumers have been benefiting from additional freedom and control over the consumption of digital media content. One example is the proliferation of personal video recorder systems (PVRs) that allow consumers to record television shows for later viewing. The adoption of PVRs has furthered interest in on-demand, consumer-driven experiences with content consumption. Examples of existing systems include on-demand digital cable, internet video streaming services, and peer-to-peer distribution networks. Other existing systems include music and video stores providing consumers with content that may be purchased and subsequently viewed on personal video or audio players.

Video catalog services list the programming available through existing video services. Such video catalog services are typically developed based on the music service or video blog service associated therewith. As a result, there are certain design limitations. For instance, the existing video catalogs are derived from a music or video blog catalog which lacks support for concepts particular to the video space such as "channel" and "series". In addition, there is no support for offline video catalog browsing. Users must be online to browse the video catalog in the existing systems. Further, there is no support for ad-sponsored free video downloads. Existing systems also typically rely on a single source for catalog content.

SUMMARY

Embodiments of the invention provide a catalog of media items to a user. In an embodiment, the invention aggregates catalog data received from a plurality of content providers. The catalog data is associated with a plurality of media items available from each of the content providers. The aggregation occurs based on rules to create a user catalog in a pre-defined catalog format for consumption by a user.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
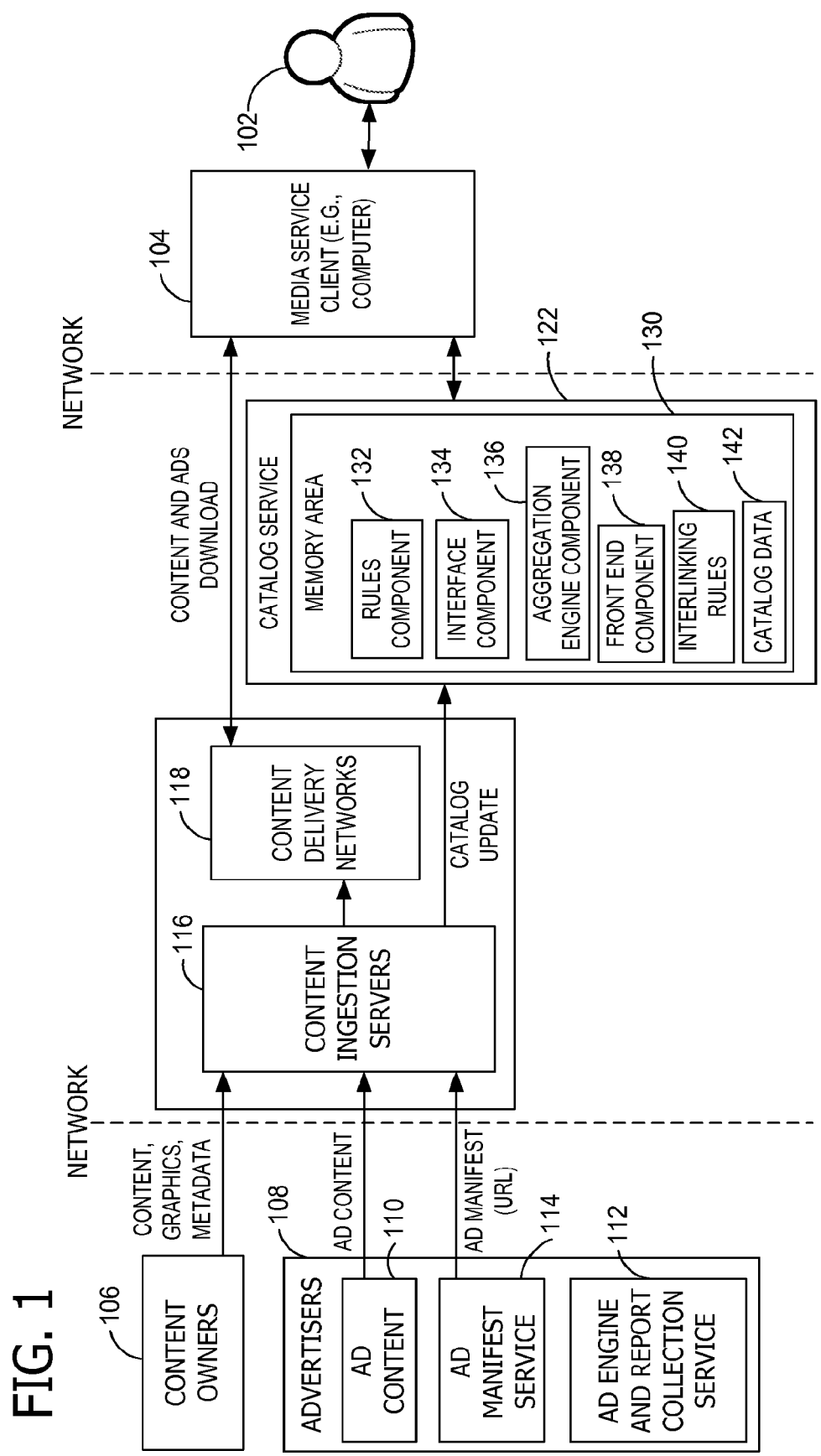
FIG. 1 is an exemplary block diagram illustrating a media content download system.

In an embodiment, the invention includes a media content catalog service such as illustrated in FIG. 1. While FIG. 1 illustrates an exemplary operating environment for the media content catalog service, aspects of the invention are not limited to such an environment. The media content catalog service is operable in other operating environments such as a video game console embodiment, a streaming media system, a traditional cable television system, an audio file catalog embodiment, a pay download embodiment, an ad-sponsored free download embodiment, a subscription embodiment, and the like.

Further, although described primarily in the context of video media files, aspects of the invention may be applied to various forms of digital media, including video and multimedia files (e.g., movies, movie trailers, television shows, etc.), audio files (e.g., music tracks, news reports, audio web logs, audio books, speeches, comedy routines, etc.), media broadcasts (e.g., webcasts, podcasts, audiocasts, videocasts, video blogs, blogcasts, etc.), and images.

Aspects of the invention support both online and offline catalog browsing with a hybrid catalog request model. Alternatively or in addition to viewing the catalog online, the hybrid catalog request model enables catalog data to be downloaded by a client for offline catalog browsing, and enables catalog data to be requested on-demand.

In one embodiment, the invention interlinks, merges, aggregates, or otherwise combines catalog data from multiple content providers to create an integrated catalog with metadata from the content providers based on rules. The integrated catalog contributes to a consistent user experience. The rules are configurable and may be updated without recompiling the aggregation engine. Exemplary rules are shown in Appendix A. While the combination of the catalog data may be referred to as "interlinking" and/or "merging" in particular embodiments, aspects of the invention are operable with any process to combine the catalog data.

Referring again to FIG. 1, an exemplary block diagram illustrates a media content download system. In one embodiment, the media content download system of FIG. 1 is an Internet on-demand video service that offers a large catalog of program content that may be downloaded by users free of charge (e.g., no subscription fee), on a subscription basis, or on a pay-per-download basis. The program content and ads (e.g., content items) are always available. For example, the content items may be stored on a computing device local to the user 102 such as media service client 104, or archived on a server (e.g., such as owned by content owners 106). The content items may be organized in a hierarchy of seasons each having series with each series having episodes. Revenue is generated by dynamically associating ads with the program content at playback time. The ads are inserted into the program content at playback time, and as such, may change from viewing to viewing.

The content owners 106 or providers supply program content (e.g., video and/or audio files) with associated metadata. Exemplary video fundamentals provided by the content owners 106 are shown in Appendix B. The example in Appendix B is merely exemplary. Other embodiments of the video fundamentals (e.g., markup language files) are contemplated. This metadata also includes the locations in the video at which ads can be inserted (e.g., ad breaks), and which ads provider is responsible for running the ad campaigns. One or more ads providers or advertisers 108 sell ads against the ad breaks. The ads providers supply ad content 110. The ads providers also run an ad engine and report collection service 112 for collecting the reports of which ads have been played. Furthermore, the ads providers make available ad manifest files via an ad manifest service 114. The ad manifests may be distributed via database, stream, file, or the like. The ad manifests include information about the current ad campaigns including which ads (or groups of ads) should be associated with which types of program content. The ad manifests also specify when the advertising may be shown and on what devices/formats. The ad manifests further include the definition of tracking events for reporting on the advertising playback (e.g., a video ad was played, thus it can be billed).

Content ingestion servers 116 receive the program content supplied by the content owners 106 together with the location of the ad manifests. Content delivery networks 118 interface with the media service client 104 or other computing device associated with the user 102 to deliver the content items including program content and advertisements to the user 102.

The user 102 interfaces with the media service client 104, application, computing device, or the like that provides functionality such as browsing, searching, downloading, managing and consuming the content items. The media service client 104 downloads catalog data 142 from a catalog service 122 and allows the user 102 to browse it in search of content items. Once an item is selected for download, the corresponding ad manifest is retrieved by the media service client 104 and stored. The ad manifest for each item of program content includes the information for determining which ads should be downloaded together with the program content. The media service client 104 downloads the selected program content and associated ads. Downloading includes retrieving the program content and associated ads. Downloading may also include receiving the program content and associated ads pushed from another computing device (e.g., pushed from a server at regular intervals).

The catalog service 122 includes or has access to a memory area 130. The memory area 130 stores a plurality of interlinking rules 140. The interlinking rules 140 define the processing of input data. The processing may include interlinking, merging, or any other combination of the catalog data 142. The memory area 130 further stores the catalog data 142 from the content owners 106. The catalog data 142 is associated with a plurality of media items available from each of the content owners 106. The catalog data 142 includes metadata items describing the media items. Exemplary metadata items describe aspects of the media item such as category, genre, contributor, ratings, and roles (e.g., actors, actresses).

In one embodiment, one or more computer-readable media or other memory areas such as memory area 130 associated with the catalog service 122 have computer-executable components comprising a rules component 132, an interface component 134, an aggregation engine component 136, and a front end component 138. The rules component 132 enables configuration, by the user 102, of interlinking rules 140 for combining catalog data such as catalog data 142 from the content providers or owners 106. The interface component 134 receives, from the content owners 106, the catalog data 142 including a plurality of metadata items. Each of the plurality of metadata items includes channel metadata and group metadata. The channel metadata and group metadata describe a media item associated with the metadata item. The aggregation engine component 136 combines the catalog data 142 received by the interface component 134 at least by comparing the channel metadata and group metadata from the received catalog data 142 to identify similar media items. The front end component 138 provides the combined catalog data 142 to the user 102. In an embodiment, the rules component 132 updates the interlinking rules 140 based on input from the user 102 without recompiling the aggregation engine component 136.

In an embodiment of the invention, a computer, computing device, or other general purpose computing device is suitable for use as the catalog service 122 in the figures illustrated and described herein. The computer has one or more processors or processing units and access to a memory area such as memory area 130.

The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

In operation, a computing device executes computer-executable instructions such as those illustrated in the figures to implement aspects of the invention.

Figure 2:
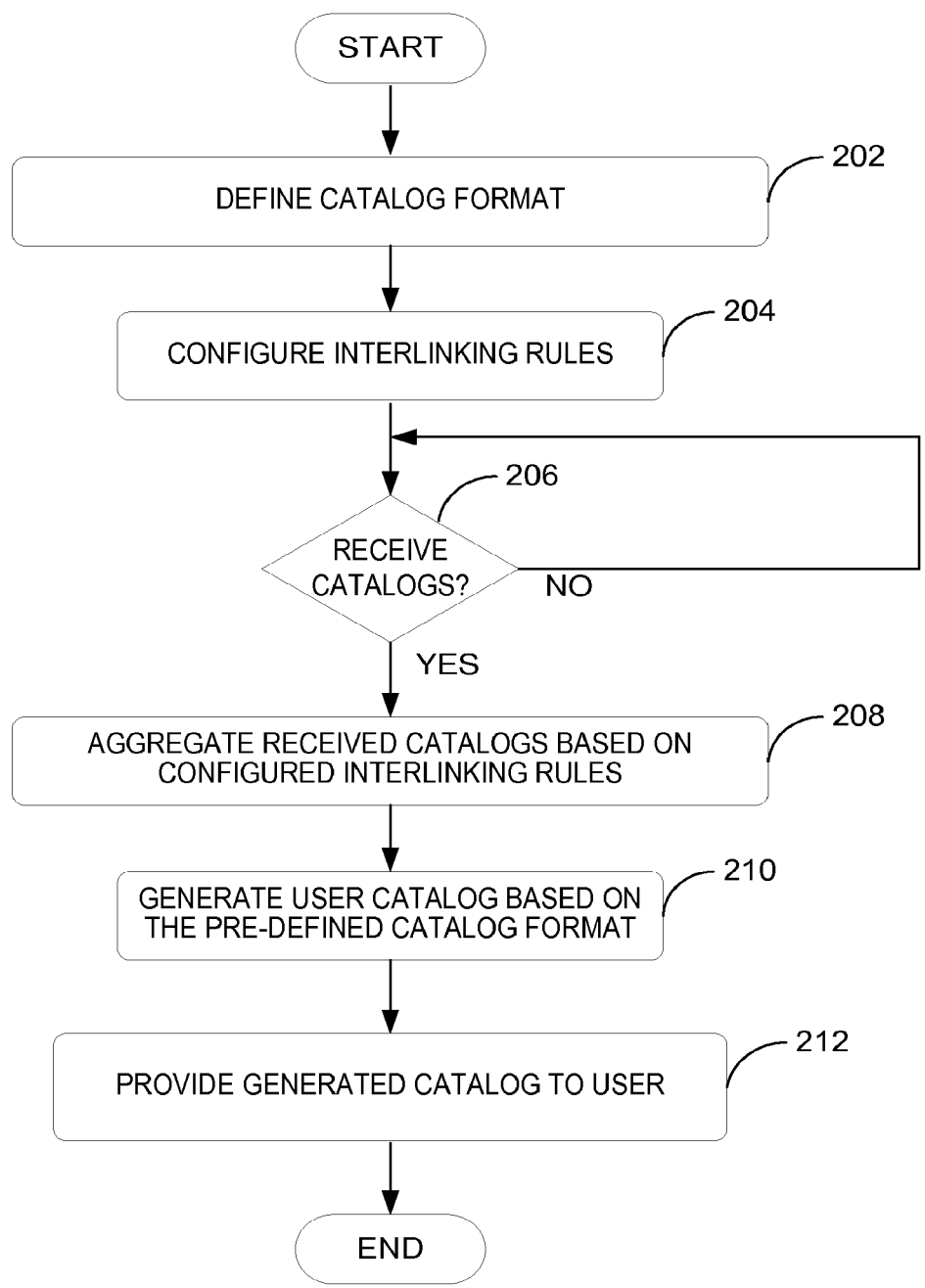
FIG. 2 is an exemplary flow chart illustrating operation of a video catalog service.

Referring next to FIG. 2, an exemplary flow chart illustrates operation of a video catalog service. At 202, the catalog format is defined according to a multi-field schema or other catalog format such as described in Appendix C. The catalog format stores metadata in fields such as a virtual channels data field, a video data field, a video group data field, a video series data field, a contributor data field, a poster data field, a trailer data field, and a supplementary data field. Each provider may create a virtual channel of content. The virtual channels data field stores metadata corresponding to a video list defining one or more video elements and a contributor list defining one or more contributor elements. Each of the video elements has an identifier and a title associated therewith. Each of the contributor elements identifies a contributor to the media content. The video group concept allows grouping of similar or related media content items together (e.g., by series, actor, movies, or television award). The catalog format also includes an action type for each of the received catalogs. The action type includes one or more of the following: add, edit, and delete. Interlinking and/or merging rules are configured at 204. The interlinking rules may be configured based on input from the user or automatically adjusted as a result of previous interlinking operations (e.g., a feedback system). The flow loops until catalog data is received from the content providers at 206. The catalog data being associated with a plurality of media items available from each of the content providers. In an embodiment, receiving the catalog data includes importing and loading a data feed from each of the content providers. The content providers format their catalog data according to the multi-field schema supported by aspects of the invention. Alternatively or in addition, a tool (e.g., a web tool) receives the catalog data from the content providers as input and outputs data in conformance with the schema.

The received catalog data is aggregated or merged at 208 based on the configured interlinking and/or merging rules. In an embodiment, interlinking comprises comparing the metadata items from the catalog data to identify similar media items. Aspects of the invention are operable with a plurality of techniques for identifying similar media items, or other forms of metadata matching, including, for example, fuzzy matching techniques. Merging and aggregating the catalog data includes parsing the catalog data received from the plurality of content providers and assigning the parsed catalog data to one or more fields of the multi-field schema.

The user catalog is generated at 210 or formatted from the aggregated catalog data based on the pre-defined catalog format for consumption by the user. In an embodiment, generating the user catalog includes propagating the user catalog to a front end database for access by the network interface. The generated user catalog is provided to the user at 212, for example, by a network interface, on a scheduled basis or on demand.

Aspects of the invention further include transmitting a portion of the generated user catalog to the user. The portion of the generated user catalog may represent an incremental update to a previously transmitted user catalog. Transmission of the incremental update reduces download time and conserves bandwidth. The incremental updates reflect the changes made to the catalog since the last download. Such options may be based on user preferences or system-defined preferences. Exemplary preferences may direct, for example, the download of a full catalog if the user is operating from a personal computer or download incremental updates if the user is operating from a mobile device.

In one embodiment, one or more computer-readable media have computer-executable instructions for performing the method illustrated in FIG. 2.

Figure 3:
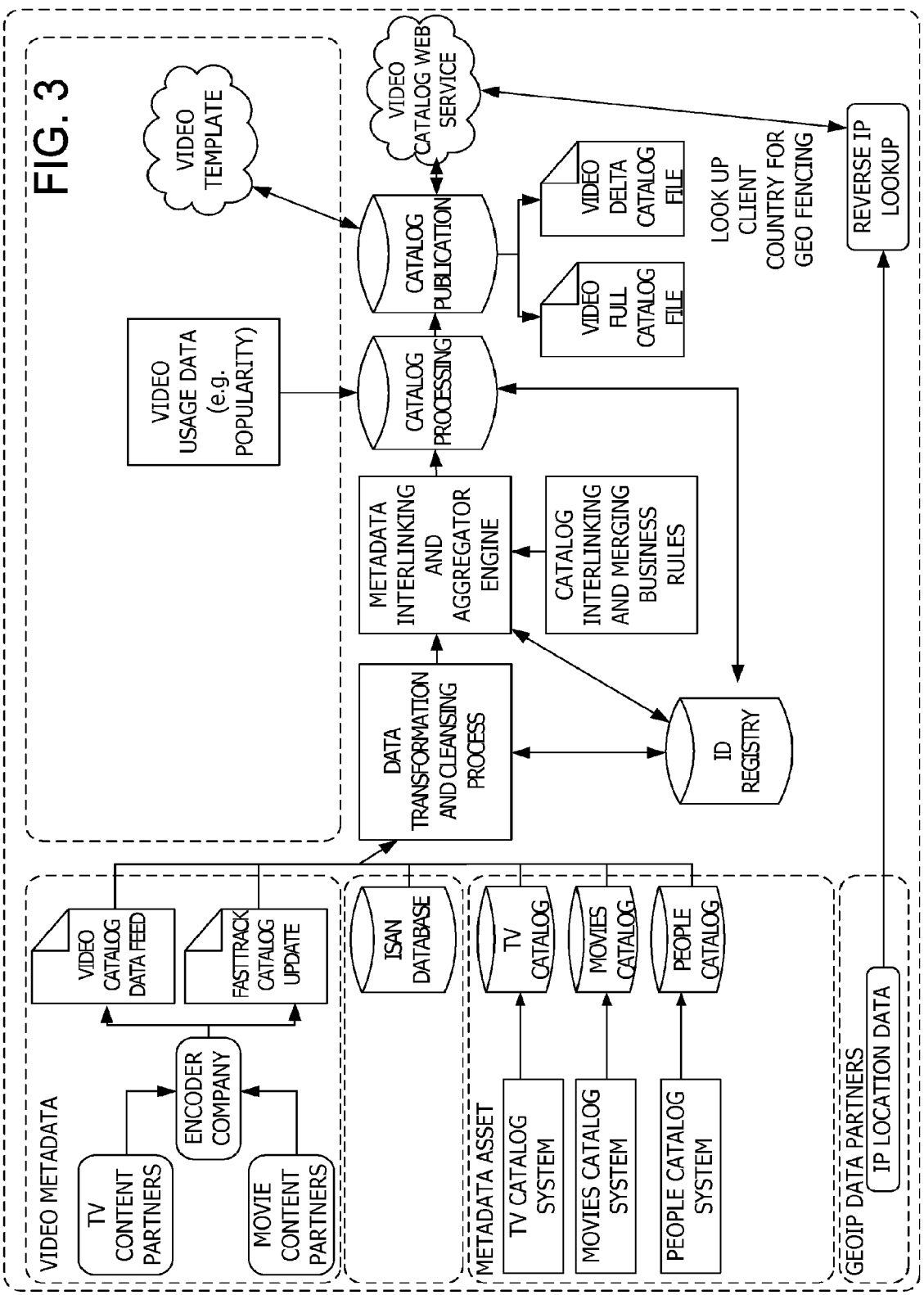
FIG. 3 is an exemplary block diagram illustrating a video catalog system.

Referring next to FIG. 3, an exemplary block diagram illustrates a video catalog system. In this exemplary embodiment, International Standard Audiovisual Number (ISAN) data import is supported. Metadata is interlinked and merged at the ISAN identifier level. Aspects of the invention map the IDs across the content providers.

Figure 4:
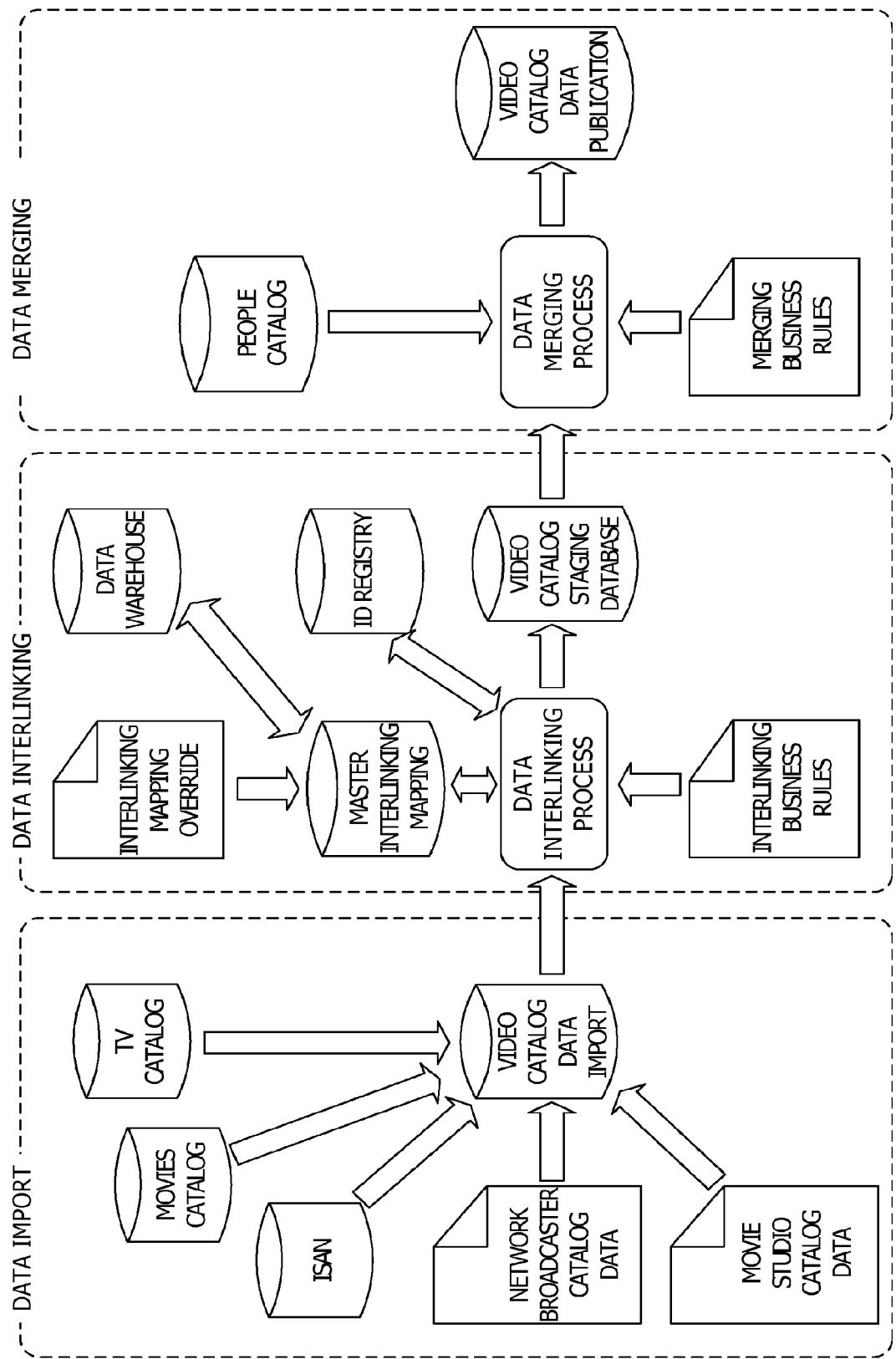
FIG. 4 is an exemplary block diagram illustrating the import, interlinking, and merging of metadata from content providers.

Referring next to FIG. 4, an exemplary block diagram illustrates the import, interlinking, and merging of metadata from content providers. Data interlinking merges metadata items based on a set of business rules. One outcome of this process is to generate a mapping table with mapping between elements.

Figure 5:
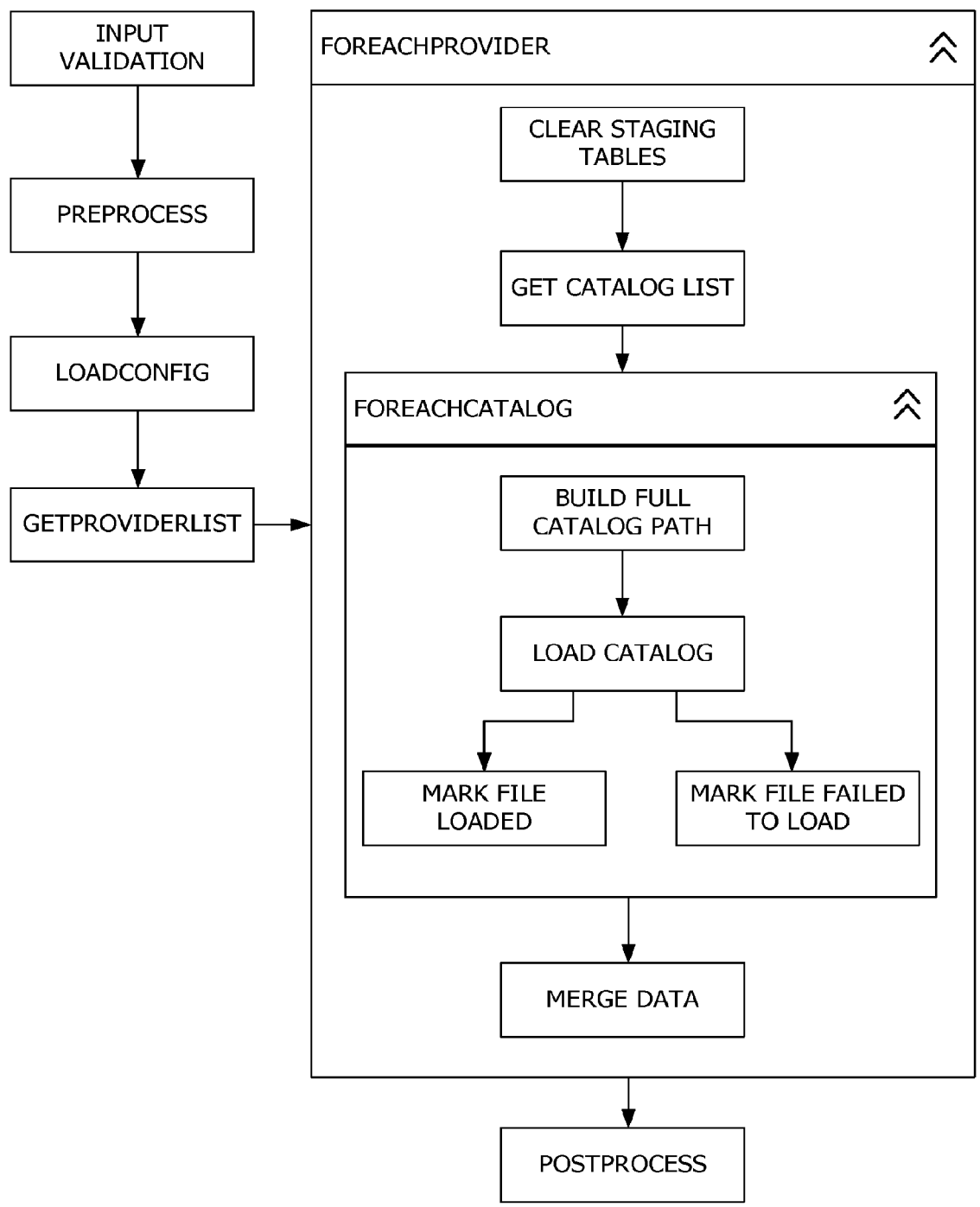
FIG. 5 is an exemplary flow chart illustrating receipt of catalogs from content providers.
Figure 6:
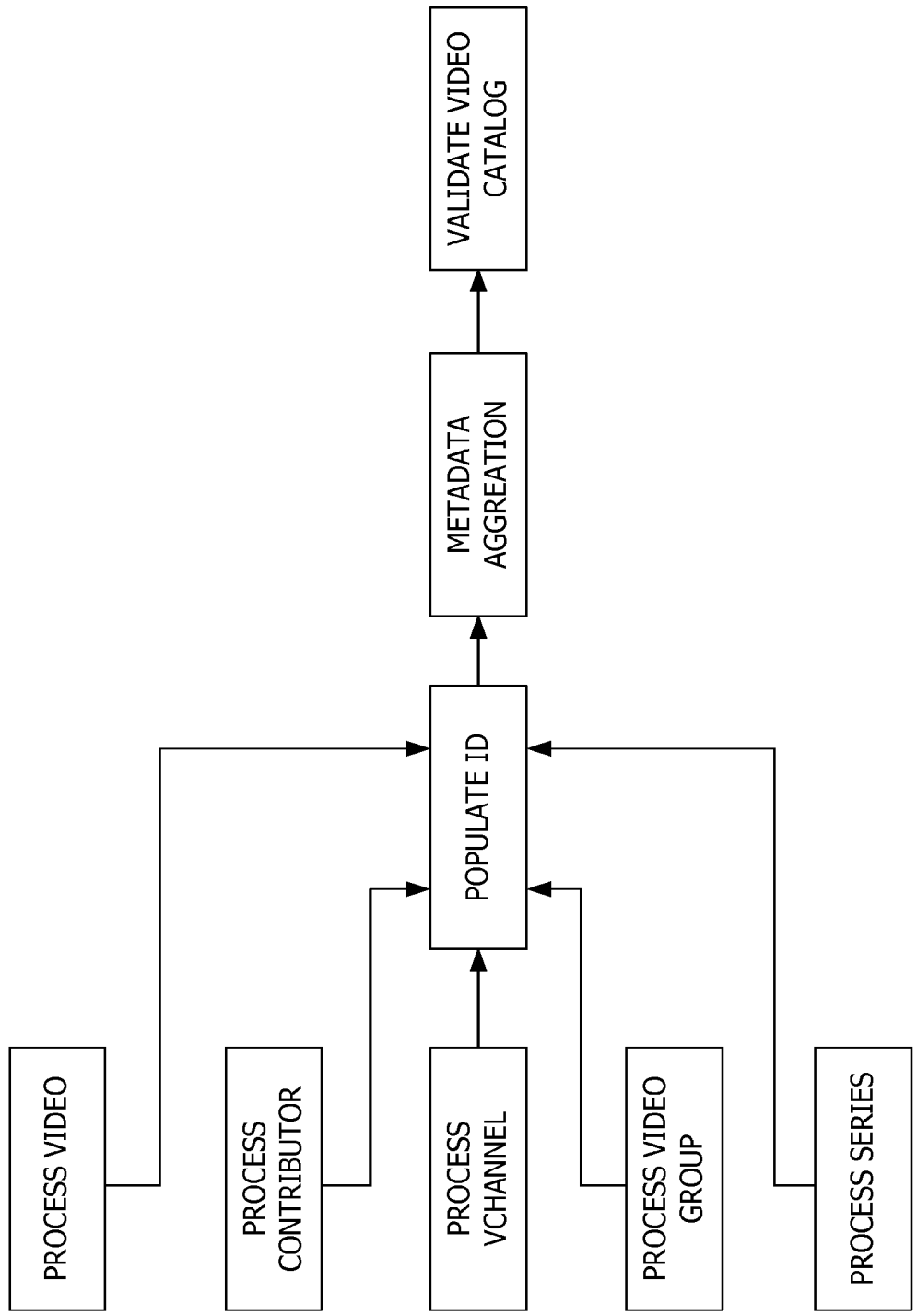
FIG. 6 is an exemplary flow chart illustrating metadata aggregation.

Referring next to FIG. 5, an exemplary flow chart illustrates receipt of catalogs from content providers. Referring next to FIG. 6, an exemplary flow chart illustrates metadata aggregation.

Figure 7:
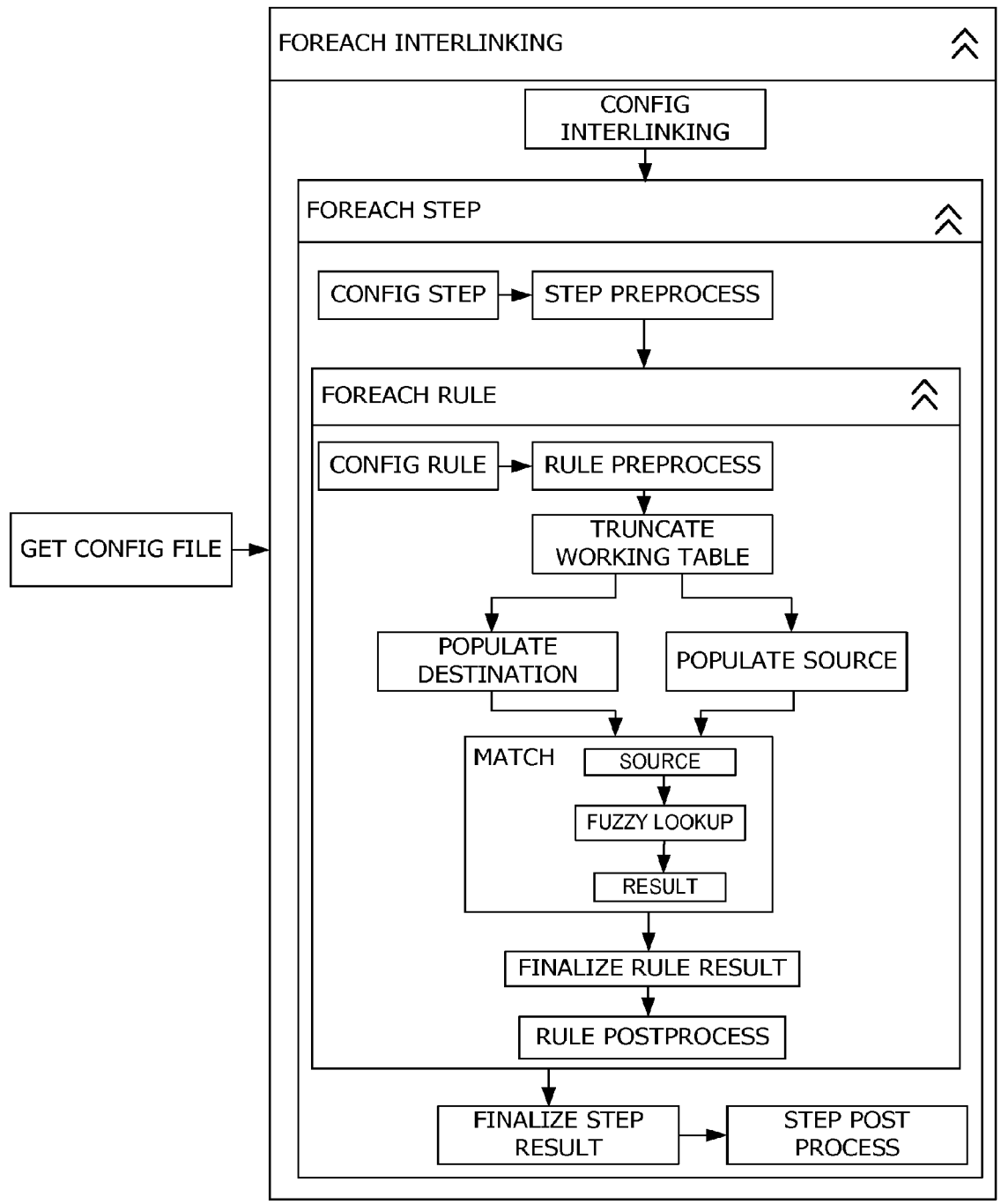
FIG. 7 is an exemplary flow chart illustrating rule-based catalog interlinking.

Referring next to FIG. 7, an exemplary flow chart illustrating rule-based catalog interlinking. Each rule includes one or more of the following parameters: attribute name (e.g., attribute/collection name to match), weight (e.g., weight for this rule), and a similarity threshold score (e.g., a minimum similarity score threshold for this rule to link the metadata item).

Figure 8A:
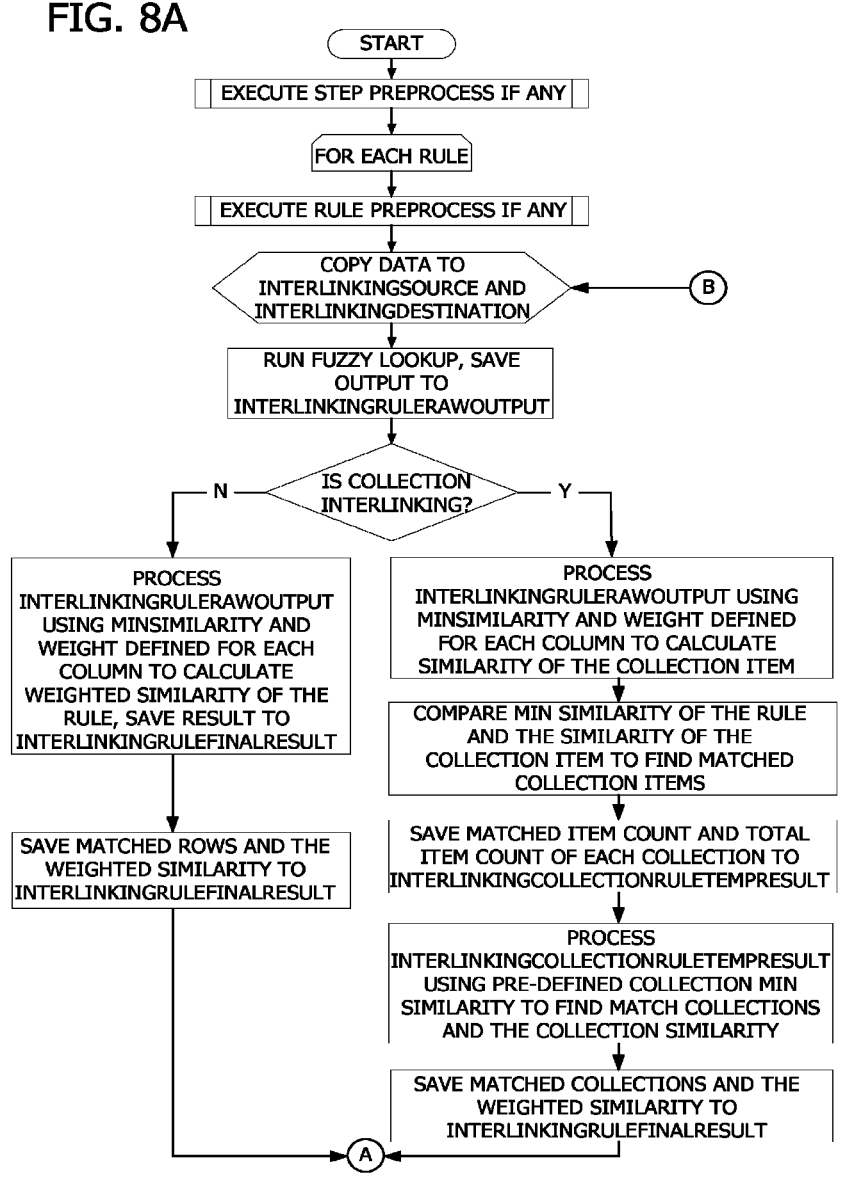
FIG. 8A and FIG. 8B are an exemplary flow chart illustrating a similarity analysis during rule-based catalog interlinking.
Figure 8B:
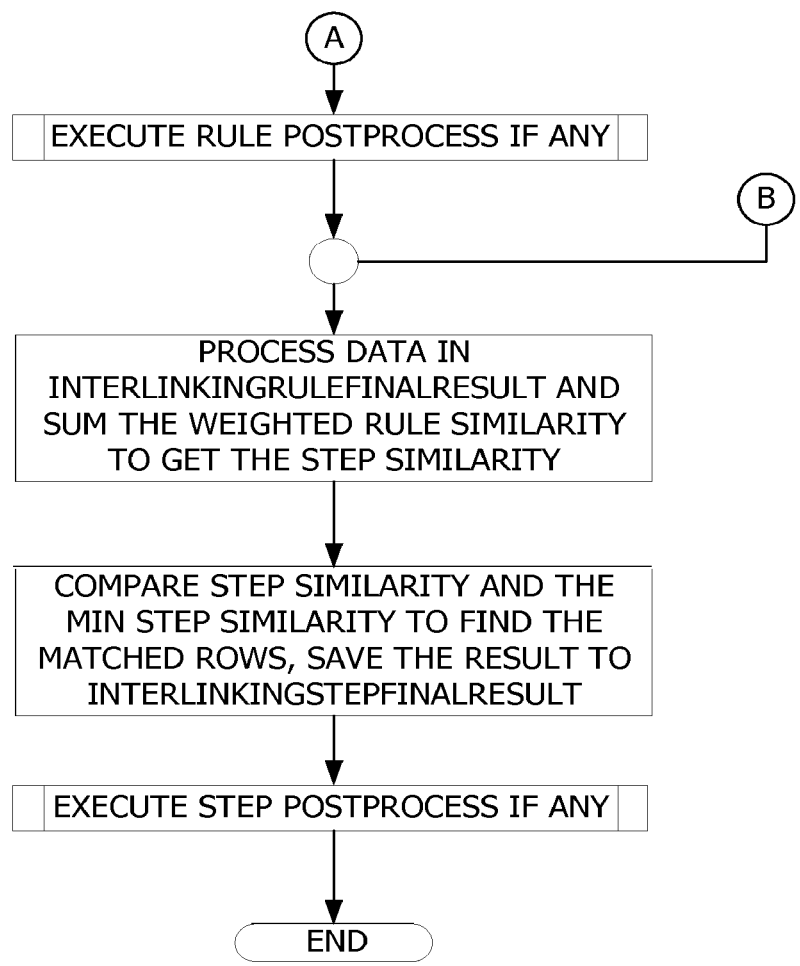

Referring next to FIG. 8A and FIG. 8B, an exemplary flow chart illustrating a similarity analysis during rule-based metadata interlinking. Metadata interlinking is a multi step process. Each rule may have a different significance to a step; therefore, rules are weighted in one embodiment. To control the quality of the interlinking, each rule has a minimum similarity. If the similarity is less then the minimum, it is not considered. The summation of the weighted similarity of all rules defines the similarity of a step, which then may be compared to the step's minimum similarity to generate a match. An exemplary summation is shown below in equation (1).

$$SS = \sum_{n=1}^{RC} RSn * RWn \qquad (1)$$

where SS represents the step similarity, RS represents the rule similarity, RW represents the rule weight, and RC represents the rule count.

In one embodiment, the fuzzy matching algorithm works on two tables at a time (e.g., "source" and "destination" tables). Multiple columns of each table are considered for the fuzzy look up. Each column may have a different significance to the rule, therefore, columns are weighted. To control the quality of the interlinking, each column has a minimum similarity. If the similarity is less then the minimum, it is not considered. The summation of the weighted similarity of all columns defines the similarity of the rule. An exemplary summation is shown below in equation (2)

$$RS = \sum_{n=1}^{CC} CSn * CWn \qquad (2)$$

wherein RS represents the rule similarity, CS represents the column similarity, CW represents the column weight, and CC represents the column count.

Data normalization is performed at the column level. In one embodiment, multiple normalization processes are defined for each column and executed in a predefined order.

In "row level interlinking," the names, birth dates, birth places, etc. of two people may be compared. These attributes are stored in a single row because of their one-to-one relationship with the people. A result row is built from multiple source rows. In "collection level interlinking," the peoples' works (e.g., songs they've sang, movies they have starred in, etc.) are compared. A result collection is built from multiple source collections. To perform collection level interlinking, each item of the collection is compared as with row level interlinking. Treated as a collection, the collection level similarity may be calculated and compared to a predefined minimum collection similarity. There are many ways of defining collection similarity, as shown in equations (3), (4), and (5).

$$CS = MC/SCC \qquad (3)$$

$$CS = MC/DCC \qquad (4)$$

$$CS = MC/(SCC + DCC - MC) \qquad (5)$$

where SCC represents a source collection count, DCC represents a destination collection count, MC represents a match count, and CS represents a collection similarity. Alternatively or in addition to a calculated relevant number, collection similarity may also be defined as a fixed number.

In one embodiment, the collection level interlinking is performed after the row level interlinking. In an embodiment, the fuzzy matching algorithm uses a set of pre-defined working tables as the input and output at runtime.

To differentiate columns from different sources in a row merge, or to differentiate collections from different sources in a collection merge, a priority is assigned to each of column/collection. There are two types of priority: static (e.g., pre-defined) and dynamic (e.g., content based). A static priority is a predefined, fixed value which does not change based on the content of the data. A dynamic priority is based on the content of the data. For example, for a row merge, the priority may be based on the value of the content or the string length of the content. For a collection merge, the priority may be based on the collection item count and a maximum and/or minimum value of a column.

In an embodiment, the priorities are the same from different sources. There are multiple, different ways of handling such a conflict including selecting one of the sources, or concatenating or summing the content from the conflicting sources. When performing a row merge, selecting one of the sources includes selecting one of the source column contents as the result column content. Concatenating the content comprises concatenating the string type data from the source columns for use as the result column content. Summing the content comprises summing the numerical data in the source column content as the result column content.

When performing a collection merge, selecting one of the sources includes selecting one of the collections as the result collection. Concatenating the content comprises adding the source collections items to the result collection.

Aspects of the invention may be implemented as a class of application programming interface routines. In an embodiment, MergeWorkerBase is the base abstract class, and different types of merges are implemented as different sub classes thereof. A RowMergeWorker class implements the logic of row merge. A CollectionMergeWorker class implements the logic of collection merge.

Although described in connection with an exemplary computing system environment, embodiments of the invention are operational with numerous other general purpose or special purpose computing system environments or configurations. The computing system environment illustrated in FIG. 1 is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, handheld or laptop devices, multiprocessor systems, microprocessor-based systems, set top boxes, PoP devices, gaming consoles, programmable consumer electronics, mobile telephones, network PCs, minicomputers, mainframe computers, distributed computing environments that include any of the above systems or devices, and the like.

The following examples further illustrate embodiments of the invention. The figures, description, and examples herein as well as elements not specifically described herein but within the scope of aspects of the invention constitute means for aggregating the metadata items from the catalog data into the merged catalog data.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

The following are exemplary business rules for aggregating content from multiple providers and from a single provider.

Video Aggregation Among Multiple Providers

Partner A and Partner B have Movie A in their inventory, and they both provide the cover art and metadata for the movie. Even though the movie can be purchased/downloaded from the two content providers, aspects of the invention provide a consistent experience to users for browsing the movie in the catalog described herein. For example, the cover art and its movie metadata only show up once the initial catalog browsing experience. When the user decides to purchase or download Movie A, the service presents the offers from both Partner A and Partner B and allows the user to choose from which partner to purchase.

An exemplary configuration for the business rules for aggregating the video catalog are shown below.

Interlinking the video from Partner A and Partner B
If the ISANs are identical, the service in one embodiment of the invention considers them to be the same video
For those videos that do not match based on the above rule, if the overall similarity score of a video pair is over 90%, the service considers them to be the same video. The overall similarity is the sum of similarity score of the individual rule. Each individual rule is calculated based on the similarity of an attribute pair*weight. Below are some sample rules:

Video Title Interlinking Rule:
  Similarity score=Video Title Similarity Score*90% (weight) If the Similarity Score <70%, consider the similarity score=0
Earliest available date Interlinking Rule:
  Similarity score=(If the month and year of the Earliest Available Date Match, then 100, otherwise 0)*10% (weight)

For those videos that do not match based on the above rule, if the overall similarity score of a video pair is over 90%, we consider them to be the same video as well.

Video Title Interlinking Rule:
  Similarity score=Video Title Similarity Score*50% (weight) If the Similarity Score <60%, consider, the similarity score=0
Earliest available date Interlinking Rule:
  Similarity score=(If the year of the Earliest Available Date Match, then 100, otherwise 0)*20% (weight)
Cast List Interlinking Rule
  Similarity score=(If top 10 cast list match, then 100, otherwise 0)*20% (weight). Top 10 cast list is sorted by cast ranking Merging the video metadata from Partner A and Partner B to create the best metadata user experience
  For all the non-interlinked video, copy all the data to the final publication table
  For interlinked video matches,
    Use Partner A video cover art in the final publication table. If Partner A does not have cover art, use Partner B cover art
    Use Partner A description in the final publication table. If Partner A does not have description, use Partner B description
    Use Partner A MPAA rating in the final publication table. If Partner A does not have MPAA rating, use Partner B MPAA rating
    Use Partner B cast list in the final publication table. If Partner B does not have cast list, use Partner B cast list Video Group Aggregation Among a Single Provider
  Partner A provides two similar law-related television shows. To help the user find the desired show, the service displays all episodes for both shows. The business rules to implement these actions are based on the following pattern: the video title starts with "Law" and the video type is either a series, mini-series, limited series, or movie.

APPENDIX B

Exemplary video fundamentals data are shown below as an extensible markup language (XML) file.

```
<?xml version="1.0" encoding="UTF-8"?>
<!--************************************************************-->
<!-- This xml defines video fundamentals.
    -->
<!-- WARNING: The ids defined in this file will be persisted.
-->
<!--************************************************************-->
<VideoFundamentals xmlns:xsi="http://www.w3.org/2001/XMLSchema-instance">
  <RoleList>
    <Role id="1" name="Actor" />
    <Role id="2" name="Director" />
    <Role id="3" name="Guest Star" />
    <Role id="4" name="Host" />
    <Role id="5" name="Producer" />
    <Role id="6" name="Writer" />
  </RoleList>
  <VideoTypeList>
    <VideoType id="1" name="Movie"/>
    <VideoType id="2" name="Limited Series"/>
    <VideoType id="3" name="Miniseries"/>
    <VideoType id="4" name="Serial"/>
    <VideoType id="5" name="Series"/>
    <VideoType id="6" name="Short Film"/>
    <VideoType id="7" name="Special"/>
  </VideoTypeList>
  <FlagList>
    <Flag id="1" name="CC" />
    <Flag id="2" name="Stereo" />
    <Flag id="3" name="Repeat" />
    <Flag id="4" name="New" />
    <Flag id="5" name="Live" />
    <Flag id="6" name="Tape" />
    <Flag id="7" name="Delayed" />
    <Flag id="8" name="Subtitled" />
    <Flag id="9" name="Premiere" />
    <Flag id="10" name="Season Premiere" />
    <Flag id="11" name="Series Premiere" />
    <Flag id="12" name="Finale" />
    <Flag id="13" name="Season Finale" />
    <Flag id="14" name="Series Finale" />
    <Flag id="15" name="Dolby" />
    <Flag id="16" name="Dolby Digital" />
    <Flag id="17" name="Joined In Progress" />
    <Flag id="18" name="Cable in the Classroom" />
    <Flag id="19" name="Secondary Audio" />
    <Flag id="20" name="Blackout" />
    <Flag id="21" name="3D" />
    <Flag id="22" name="DVS" />
    <Flag id="23" name="Mini Series" />
    <Flag id="24" name="Live Sports" />
    <Flag id="25" name="Made for TV" />
    <Flag id="26" name="Standard aspect ratio 4:3 (1:33:1)" />
    <Flag id="27" name="HDTV aspect ratio 16:9 (1:85:1)" />
    <Flag id="28" name="CinemaScope aspect ratio 2:35:1" />
    <Flag id="29" name="High Definition TV format. Program that is broadcast in 1080p (1920x1080)" />
    <Flag id="30" name="High Definition TV format. Program that is broadcast in 720p (1280x720) or 1080i" />
    <Flag id="31" name="Enhanced Definition TV format program that is broadcast in 480p using progressive scanning at a 640x480 high pixel resolution" />
    <Flag id="32" name="Standard Definition TV format program that is broadcast in 480i using interlaced scanning at a 640x480 high pixel resolution" />
  </FlagList>
  <CategoryList>
    <Category parentId="0" id="0" name="Root" />
    <Category parentId="0" id="1" name="General" />
      <Category parentId="1" id="100" name="All" />
      <Category parentId="1" id="101" name="Action/Adventure" />
      <Category parentId="1" id="102" name="Comedy" />
      <Category parentId="1" id="103" name="Documentary/Bio" />
      <Category parentId="1" id="104" name="Drama" />
      <Category parentId="1" id="105" name="Educational" />
      <Category parentId="1" id="106" name="Family/Children" />
      <Category parentId="1" id="107" name="Movies" />
      <Category parentId="1" id="108" name="Music" />
      <Category parentId="1" id="109" name="News" />
      <Category parentId="1" id="110" name="Sci-Fi/Fantasy" />
      <Category parentId="1" id="111" name="Soap" />
      <Category parentId="1" id="112" name="Sports" />
      <Category parentId="1" id="113" name="Other" />
    <Category parentId="0" id="2" name="Educational" />
      <Category parentId="2" id="200" name="All" />
      <Category parentId="2" id="201" name="Arts" />
      <Category parentId="2" id="202" name="Biography" />
      <Category parentId="2" id="203" name="Documentary" />
      <Category parentId="2" id="204" name="How-to" />
      <Category parentId="2" id="205" name="Science" />
      <Category parentId="2" id="206" name="Other" />
```

-continued

```
<Category parentId="0" id="3" name="Kids" />
  <Category parentId="3" id="300" name="All" />
  <Category parentId="3" id="301" name="Adventure" />
  <Category parentId="3" id="302" name="Animated" />
  <Category parentId="3" id="303" name="Comedy" />
  <Category parentId="3" id="304" name="Educational" />
  <Category parentId="3" id="305" name="Special" />
  <Category parentId="3" id="306" name="Other" />
<Category parentId="0" id="4" name="Lifestyle" />
  <Category parentId="4" id="400" name="All" />
  <Category parentId="4" id="401" name="Adults Only" />
  <Category parentId="4" id="402" name="Collectibles" />
  <Category parentId="4" id="403" name="Cooking" />
  <Category parentId="4" id="404" name="Exercise" />
  <Category parentId="4" id="405" name="Health" />
  <Category parentId="4" id="406" name="Home and Garden" />
  <Category parentId="4" id="407" name="Outdoors" />
  <Category parentId="4" id="408" name="Religious" />
  <Category parentId="4" id="409" name="Other" />
<Category parentId="0" id="5" name="Movies" />
  <Category parentId="5" id="500" name="All" />
  <Category parentId="5" id="501" name="Action and Adventure" />
  <Category parentId="5" id="502" name="Adults Only"/>
  <Category parentId="5" id="503" name="Children" />
  <Category parentId="5" id="504" name="Comedy" />
  <Category parentId="5" id="505" name="Drama" />
  <Category parentId="5" id="506" name="Fantasy" />
  <Category parentId="5" id="507" name="Horror" />
  <Category parentId="5" id="508" name="Musical" />
  <Category parentId="5" id="509" name="Mystery" />
  <Category parentId="5" id="510" name="Romance" />
  <Category parentId="5" id="511" name="Science Fiction" />
  <Category parentId="5" id="512" name="Suspense" />
  <Category parentId="5" id="513" name="Western" />
  <Category parentId="5" id="514" name="Other" />
<Category parentId="0" id="6" name="News" />
  <Category parentId="6" id="600" name="All" />
  <Category parentId="6" id="601" name="Business" />
  <Category parentId="6" id="602" name="Current Events" />
  <Category parentId="6" id="603" name="Interview" />
  <Category parentId="6" id="604" name="Public Affairs" />
  <Category parentId="6" id="605" name="Sports" />
  <Category parentId="6" id="606" name="Weather" />
  <Category parentId="6" id="607" name="Other" />
<Category parentId="0" id="7" name="Series" />
  <Category parentId="7" id="700" name="All" />
  <Category parentId="7" id="701" name="Action/Adventure" />
  <Category parentId="7" id="702" name="Children" />
  <Category parentId="7" id="703" name="Comedy" />
  <Category parentId="7" id="704" name="Cooking" />
  <Category parentId="7" id="705" name="Drama" />
  <Category parentId="7" id="706" name="Educational" />
  <Category parentId="7" id="707" name="Game Show" />
  <Category parentId="7" id="708" name="How-to" />
  <Category parentId="7" id="709" name="Music" />
  <Category parentId="7" id="710" name="Reality" />
  <Category parentId="7" id="711" name="Soap Opera" />
  <Category parentId="7" id="712" name="Talk Show" />
  <Category parentId="7" id="713" name="Travel" />
  <Category parentId="7" id="714" name="Other" />
<Category parentId="0" id="8" name="Special" />
  <Category parentId="8" id="800" name="All" />
  <Category parentId="8" id="801" name="Awards/Event" />
  <Category parentId="8" id="802" name="Holiday" />
  <Category parentId="8" id="803" name="Music" />
  <Category parentId="8" id="804" name="Religious" />
  <Category parentId="8" id="805" name="Sports" />
  <Category parentId="8" id="806" name="Other" />
<Category parentId="0" id="9" name="Sports" />
  <Category parentId="9" id="900" name="All" />
  <Category parentId="9" id="901" name="Baseball" />
  <Category parentId="9" id="902" name="Basketball" />
  <Category parentId="9" id="903" name="Boxing" />
  <Category parentId="9" id="904" name="Football" />
  <Category parentId="9" id="905" name="Golf" />
  <Category parentId="9" id="906" name="Hockey" />
  <Category parentId="9" id="907" name="Outdoor" />
  <Category parentId="9" id="908" name="Racing" />
  <Category parentId="9" id="909" name="Soccer" />
  <Category parentId="9" id="910" name="Tennis" />
  <Category parentId="9" id="911" name="Other" />
</CategoryList>
<RatingList>
  <RatingType id="0" name="Microsoft Rating">
    <RatingValue id="1" name="All" description="For every one" />
    <RatingValue id="2" name="6+" description="" />
    <RatingValue id="3" name="12+" description="" />
    <RatingValue id="4" name="13+" description=""/>
    <RatingValue id="5" name="14+" description="" />
    <RatingValue id="6" name="15+" description="" />
    <RatingValue id="7" name="17+" description="" />
    <RatingValue id="8" name="18+" description="" />
    <RatingValue id="9" name="19+" description=""/>
    <RatingValue id="10" name="R" description="" />
    <RatingValue id="11" name="X" description="" />
  </RatingType>
  <RatingType id="100" name="MPAA Rating" countryCode="us">
    <RatingValue id="101" name="G" description="" />
    <RatingValue id="102" name="PG" description="" />
    <RatingValue id="103" name="PG-13" description="" />
    <RatingValue id="104" name="R" description="" />
    <RatingValue id="105" name="NC-17" description="" />
    <RatingValue id="106" name="X" description="" />
    <RatingValue id="107" name="NR" description="" />
    <RatingValue id="108" name="AO" description="" />
    <Descriptor id="10001" name="Adult Situations" description="" />
    <Descriptor id="10002" name="Brief Nudity" description="" />
    <Descriptor id="10003" name="Graphic Language" description="" />
    <Descriptor id="10004" name="Graphic Violence" description="" />
    <Descriptor id="10005" name="Language" description="" />
    <Descriptor id="10006" name="Mild Violence" description="" />
    <Descriptor id="10007" name="Nudity" description="" />
    <Descriptor id="10008" name="Rape" description="" />
    <Descriptor id="10009" name="Strong Sexual Content" description="" />
    <Descriptor id="10010" name="Violence" description="" />
  </RatingType>
  <RatingType id="200" name="Star Rating">
    <RatingValue id="201" name="0" description="" />
    <RatingValue id="202" name="0H" description="" />
    <RatingValue id="203" name="1" description="" />
    <RatingValue id="204" name="1H" description="" />
    <RatingValue id="205" name="2" description="" />
    <RatingValue id="206" name="2H" description="" />
    <RatingValue id="207" name="3" description="" />
    <RatingValue id="208" name="3H" description="" />
    <RatingValue id="209" name="4" description="" />
  </RatingType>
  <RatingType id="300" name="US Television Rating" countryCode="us">
    <RatingValue id="301" name="TV-G" description="" />
    <RatingValue id="302" name="TV-14" description="" />
    <RatingValue id="303" name="TV-MA" description="" />
    <RatingValue id="304" name="TV-Y" description="" />
    <RatingValue id="305" name="TV-Y7" description="" />
  </RatingType>
  <RatingType id="400" name="UK Television Rating" countryCode="uk">
    <RatingValue id="401" name="U" description="" />
    <RatingValue id="402" name="UC" description="" />
    <RatingValue id="403" name="PG" description="" />
    <RatingValue id="404" name="12" description="" />
    <RatingValue id="405" name="15" description="" />
    <RatingValue id="406" name="18" description="" />
    <RatingValue id="407" name="R18" description="" />
  </RatingType>
  <RatingType id="500" name="KR Television Rating" countryCode="kr">
    <RatingValue id="501" name="ALL" description="" />
    <RatingValue id="502" name="SEVEN" description="" />
    <RatingValue id="503" name="TWELVE" description="" />
    <RatingValue id="504" name="FIFTEEN" description="" />
    <RatingValue id="505" name="NINETEEN" description="" />
  </RatingType>
  <RatingType id="600" name="Canada Television Rating" countryCode="ca">
    <RatingValue id="601" name="18+" description="" />
```

```
    <RatingValue id="602" name="14+" description="" />
    <RatingValue id="603" name="PG" description="" />
    <RatingValue id="604" name="G" description="" />
    <RatingValue id="605" name="C8" description="" />
    <RatingValue id="606" name="C" description="" />
  </RatingType>
  <RatingType id="700" name="DE Television Rating" countryCode="de">
    <RatingValue id="701" name="ALL" description="" />
    <RatingValue id="702" name="SIX" description="" />
    <RatingValue id="703" name="TWELVE" description="" />
    <RatingValue id="704" name="SIXTEEN" description="" />
    <RatingValue id="705" name="ADULTS" description="" />
  </RatingType>
  <RatingType id="800" name="FR Television Rating" countryCode="fr">
    <RatingValue id="801" name="CAT1" description="" />
    <RatingValue id="802" name="CAT2" description="" />
    <RatingValue id="803" name="CAT3" description="" />
    <RatingValue id="804" name="CAT4" description="" />
    <RatingValue id="805" name="CAT5" description="" />
  </RatingType>
  </RatingList>
</VideoFundamentals>
```

APPENDIX C

An exemplary video catalog schema is shown below.

Video Catalog Element

| Element Name | Description |
| --- | --- |
| Video Catalog | Video catalog root element. This element has an attribute schemaVersion and includes Contributors list, Video list, Video Group list, Series list, Virtual channels list, Poster list, Trailer list, Supplementary file list, and Offer list |
| ContributorList | Define a list of contributors available. This element has no attribute but includes one or many Contributor element(s). Contributor is a person who makes a contribution to the video content. Examples are actor, actresses, writer, producer or director. Please refer to the Contributor element for more details |
| VideoList | Define a list of video available. This element has no attribute but includes one or many Video elements. Video is unique piece of content such as Movie, TV episode, Music Video or User Generated Content |
| VideoGroupList | Define a list of Video Groups. This element has no attribute but includes one or many Video Group elements. |
| SeriesList | Define a list of TV Series. This element has no attribute but includes one or many Series elements |
| VChannelList | Define a list of video channels available. This element has no attribute but includes one or many VChannel element(s). |
| PosterList | Define a list of movie poster image files associates with Video, TV series, or TV season.. This element has no attribute but includes one or many Poster Element element(s). |
| TrailerList | Define a list of video trailer files associates with Video, TV series, or TV season. This element has no attribute but includes one or many Trailer element(s). |
| SupplementaryFileList | Define a list of supplementary files associates with Video, TV series, or TV season. This element has no attribute but includes one or many SupplementaryFile element(s). |
| OfferList | Define a list of offers associates with Video, TV series, or TV season. This element has no attribute but includes one or many Offer element(s). |

Video Element

Video element defines a unique piece of video content, such as a Movie, a TV episode, a Music Video or a User Generated Content (UGC). Every unique video content will be a unique Video element. If same content is released in different format (such as HD vs. SD or different languages), each format will be a unique "Video Instance" element. However, they will all belong to the same "Video" parent element.

| Element Name | Attribute Name | Data Type | Description |
| --- | --- | --- | --- |
| Video | | TVideo | Video is unique piece of content. For example, a Movie, a TV episode, a Music Video or a User-Generated Content (UGC) |
| | id | Integer | Partner assigned unique identifier for the Video. This ID should uniquely identify a Video, and should not be changed or recycled to assign to a different Video. |

| Element Name | Attribute Name | Data Type | Description |
|---|---|---|---|
| | CRID | Char(200) | TV-anytime CRID for TV program. |
| | ISAN | Min: Char(21) Max: Char(33) | The ISAN (International Standard Audiovisual Number) is a voluntary numbering system for the identification of audiovisual works. It provides a unique, internationally recognized and permanent reference number for each audiovisual work registered in the ISAN system For example: 1234-A678-9012-3456-7-B111-2222-8 First 16 digits + 1 checksum digit are required in an embodiment. The rest of 8 digits + 1 checksum digit are optional version number |
| | title | Char(100) | Full title for the Video |
| | reducedTitle | Char(50) | Short title for the Video |
| | subTitle | Char(100) | Sub title for the Video |
| | desc | Char(4000) | Full description for the video |
| | reducedDesc | Char(100) | Short description for the video |
| | videoTypeID | Integer | Unique ID assigned by the service for the Video Type. |
| | earliestAvailableDate | DateTime | Date that the video content was available for viewing. For TV episode, this is the original air date - date when the episode is first aired. For movie, this is the release date when the movie is available for viewing in theater |
| | durationSecs | Integer | Total run time for the video in seconds |
| | productionCompany | Char(100) | Production Studio or Network For TV episode, it is the name of the Network For Movies, it is the name of the studio |
| | licensorID | Integer | Unique ID for licensor |
| | licensorType | Char(100) | Movie Studio, TV Studio, or distributor |
| | copyright | Char(255) | Copyright display text. For example, "Copyright @2004 Provider A" |
| VideoInstanceList | | TVideoInstanceList | A collection of Video Instance for the Video. "Video Instance" is a different format or version or language for a given Video. |
| RoleList | | TVideoRoleList | A collection of Role for the Video. Role contains the cast and character information for the video |
| CategoryList | | TVideoCategoryList | A list of category that the video is associated with. For TV series or episode, for association with the sub-category under "General" (i.e. in the range of 100). For Movies, for association with the sub-category under "Movie" (i.e. in the range of 500). For Music Video, for association with the category under "Music Video" (i.e. in the range of 1100). For Promo content, for association with the sub-category under "General", "Movies" or "Music Video" (i.e. in the range of 100, 500, or 1100) |
| RatingList | | TRatingList | A list of rating associates with the video. For example, MPAA or editorial rating. |
| FlagList | | TFlagList | A list of attribute associates with the video. |
| TagList | | TTagList | A collection of Tag. Tag defines a list of "keyword" associate with the video, and is used to facilitate search. |

VideoInstance Element
Video Instance is a different format or version or language of a Video (i.e. content is the same).

AudioFormat Element
AudioFormat element contains audio format information for the video.

| Element Name | Attribute Name | Data Type | Description |
|---|---|---|---|
| VideoInstance | | TVideoDataFile | Contains information of the Video Instance |
| | id | Integer | Partner assigned unique identifier of the Video Instance. This ID should uniquely identify a Video Instance, and should not be changed or recycled to assign to a different Video Instance. |
| | isDRM | Boolean | Flag indicate whether the content is DRM or not |
| | ISANVersionNumber | Char(11) | Optional version number of ISAN (Format in xxxx-xxxx-x) |
| | spokenLanguage | Char(100) | Spoken language for the video |
| AudioFormat | | TAudioFormat | Audio Format information for the Video Instance. |
| VideoFormat | | TVideoFormat | Video Format information for the Video Instance. |
| VideoFileList | | TVideoFileList | A collection of VideoFile for the VideoInstance. VideoFile is the physical video file for downloading/streaming. Generally, each VideoInstance will have only 1 VideoFile element, however, in cases when the file size for a given VideoInstance is too big, it might break into multiple small files, result in multiple VideoFile elements |
| AdGroupList | | TAdGroup | A collection of AdGroup element. AdGroup is only used in Ad-sponsored Video content. |

VideoFile Element

VideoFile element contains information of the physical video file (e.g. missionimpossible.wmv) for downloading/streaming. Generally, each VideoInstance will have only one VideoFile element, however, in cases when the file size for a given VideoInstance is too big (e.g. Titanic HD version), might break into multiple small files, result in multiple VideoFile element. For details on data relationship, please refer to the Video Catalog Data Relationship Diagram.

| Element Name | Attribute Name | Data Type | Description |
|---|---|---|---|
| VideoFile | | TVideoDataFile | Contains information of the physical video file to download/stream |
| | uuid | GUID | Partner assigned unique identifier of the physical video file |
| | url | Char(10) | URL of the physical video file |
| | size | Big Integer | Size (in bytes) of the physical video file |
| | durationSecs | Integer | Run time of the physical video file (in secs) |
| Hash | | THash | Hash |
| | type | Char(100) | Hash type. By default, it's MD5 |
| | value | Char(100) | Hash value |
| MarkerList | | TMarkerList | A collection of Marker element. Marker is only used in Ad-sponsored Video content. |

| Element Name | Attribute Name | Data Type | Description |
|---|---|---|---|
| AudioFormat | | TAudioFormat | Contains audio format info |
| | encoding | Enum | Enum defined by the service for the Audio Encoding Type. |
| | channel | String | Mono or Stereo |
| | samplingRate | Integer | Sampling Rate in Hz |
| | CC | Boolean | Closed caption flag |
| | subtitle | String | Subtitle language. If there is no subtitle available, set this field to empty string, otherwise, set this to language of the subtitle |
| | bitRate | Integer | Bit rate for the audio |

VideoFormat Element

VideoFormat element contains video format information for the video.

| Element Name | Attribute Name | Data Type | Description |
|---|---|---|---|
| VideoFormat | | TVideoFormat | Contains video format info |
| | definition | Enum | Enum defined by the service for the definition format. |
| | aspectRatio | Enum | Enum defined by the service for the Aspect Ratio. |
| | resolutionX | Integer | Resolution-X |
| | resolutionY | Integer | Resolution-Y |
| | encoding | Enum | Enum defined by the service for the Video Encoding Type. |
| | bitRate | Integer | Bit rate for the video |
| | frame | Integer | Frame/sec |

Series Element

Series element contains information for a TV series such as season, episode information etc.

| Element Name | Attribute Name | Data Type | Description |
|---|---|---|---|
| Series | | TSeries | TV Series data |
| | id | Integer | Partner assigned unique identifier for the Series. This ID should uniquely identify a Series, and should not be changed or recycled to assign to a different Series |
| | title | Char(100) | Series title. |
| | desc | Char(4000) | Full description for the Series |
| | numberOfSeason | Integer | Total number of season for the series. |
| | IsOrderBySeason | Boolean | Flag indicating whether the series is order by season or not. |
| Season | | TSeason | Season data for the TV series |
| | id | Integer | Partner assigned unique identifier for the TV Series Season. This ID should uniquely identify a TV Series season, and should not be changed or recycled to assign to a different TV Series Season |
| | seasonNumber | Integer | Season number. |
| | title | Char(100) | Series title for the season. |
| | isComplete | Boolean | Flag indicating whether the season is complete and all episodes are ready to download |
| | episodeFrequency | Char(100) | Frequency for new episodes. Examples are Daily, weekly or monthly |
| Episode | | TEpisode | TV Episode Data. |
| | videoID | Integer | Partner assigned unique ID for the TV Episode. This ID should maps to the ID defined in the VideoList element node |
| | title | Char(100) | Episode Title |
| | episodeNumber | Integer | Episode Number |
| | seasonID | Integer | Partner assigned unique ID for the Season. This ID should maps in the ID defined in the Season element node |
| | primeTimeFlag | Boolean | Flag indicating whether the episode is broadcast in PrimeTime or Not |

VideoGroup Element
Video Group is for grouping purposes. Below are a few scenario using Video Group for grouping
- Group Related Video/Content. For example,
    - Action Movie III collection—use Video group to group Action Movie III and Action Movie III: Director's Cut into same bucket
- Promotion/Bundling
    - Use Video Group to group all Action Movie movies (into single bucket) and offer special discount price for customers to download
- Group award winner content together. For example:
    - Award Winner collection—use Video group to group all movies that won a particular award
- Group editorial recommendation together. For example:
    - What's good to watch for 1$^{st}$ date—use Video group to provide TV/Movies recommendation for 1$^{st}$ date
    - Best 10 Movies for year 2006—use Video group to provide top Movies recommendation
    - Feature Video—use Video Group to define Feature Video

| Element Name | Attribute Name | Data Type | Description |
|---|---|---|---|
| VideoGroup | | TVideoGroup | Video Group is used for grouping purposes. |
| | id | Integer | Partner assigned unique identifier for the Video Group. This ID should uniquely identify a Video Group, and should not be changed or recycled to assign to a different Video Group |
| | title | Char(100) | Video Group Title. |
| | type | Char(100) | Type of the video group, explains why the videos are grouped together. For example, "Related Video" |
| VideoList | | TVideoRef | Define a list of Video available in this video group |
| | VideoID | Integer | Partner assigned unique identifier for the video. This ID should maps in the ID defined in the VideoList element node |
| VideoInstanceList | | TVideoInstanceRef | Define a list of video instance available in this video group |
| | VideoInstanceID | Integer | Partner assigned unique identifier for the video instance. This ID should maps in the ID defined in the VideoInstance element node |
| SeriesList | | TSeriesRef | Define a list of Series available in this video group |
| | SeriesID | Integer | Partner assigned unique identifier for the series. This ID should maps in the ID defined in the Series element node |

Trailer Element
Trailer element enables provider to associate video trailers to a Video (movies or TV episode), a TV series, a TV Series Season, a Video group or a Video Instance.

| Element Name | Attribute Name | Data Type | Description |
|---|---|---|---|
| Trailer | | TTrailer | Video Trailer Data |
| | associateElementType | Enum | Type of element that the video trailer is associated with. For example, a video trailer can be associated to a TV Series, TV season or a particular TV Episode or movie, or a Video Instance etc. |
| | associateElementId | Integer | Element ID that the video trailer is associated with. The type of ID (whether it is a Series ID, Season ID, Video ID or Video Instance ID) is depended on the associateElementType. |
| | uuid | Integer | Partner assigned unique identifier of the video trailer file |
| | url | Char(1024) | URL of the video trailer file |
| | size | Big Integer | Size (in bytes) of the video trailer file |
| | durationSecs | Integer | Run time of the video trailer file (in secs) |
| | ranking | Integer | Ranking of the video trailer in ascending order, where 1 being the first trailer for displaying on the UI |
| AudioFormat | | TAudioFormat | Contains the Audio Format information for the video trailer |
| VideoFormat | | TVideoFormat | contains the Video Format information for the video trailer |

Poster Element

Poster element enables provider to associate poster image files to a Video (movies or TV episode), a TV series, a Season of a TV series, a Video group or a Video Instance.

| Element Name | Attribute Name | Data Type | Description |
|---|---|---|---|
| Poster | | TPoster | Poster image Data |
| | associateElementType | Enum | Type of element that the poster image is associated with. A poster image can be associated to a TV Series, TV season or a particular TV Episode or movie etc. |
| | associateElementId | Integer | Element ID that the poster image is associated with. The type of ID (whether it is a Series ID, Season ID, Video ID or Video Instance ID) is depended on the AssociateElementType. |
| | uuid | Integer | Partner assigned unique identifier of the poster image file |
| | url | Char(1024) | URL of the poster image file |
| | size | Integer | Size (in bytes) of the image file |
| ImageFormat | | TImageFormat | Image Format information for the poster. |

ImageFormat Element

ImageFormat element contains image format information for poster or supplementary image file.

| Element Name | Attribute Name | Data Type | Description |
|---|---|---|---|
| ImageFormat | | TImageFormat | Contains information of the image format info |
| | formatType | Enum | Enum assigned by the service for the Encoding Type. |
| | width | Integer | Image width (in pixels) |
| | height | Integer | Image height (in pixels) |

Offer Element

Offer element enables provider to associate offer to a Video (movies or TV episode), a TV series, a Season of a TV series, a Video group or a Video Instance.

| Element Name | Attribute Name | Data Type | Description |
|---|---|---|---|
| Offer | | TOffer | Contains offer information |
| | offerId | Integer | Unique ID will be used for requesting fulfillment |
| | associateElementType | Enum | Type of element that the offer is associated with. For example, an offer can be associated to a TV Series, TV season or a particular TV Episode or movie etc. For example, if the network wants to associate an offer for HD version of episode 3 for a particular series during a particular Season 1, it can be done by setting this field to "VideoInstane", and set the "AssociateElementID" to the Video Instance ID of the series season 1 episode 3. |
| | associateElementId | Integer | Element ID that the offer is associated with. The type of ID (whether it is a Series ID, Season ID, Video ID or Video Instance ID) is depended on the AssociateElementType. |
| | offerType | TUsage | Type of offering. Examples are Download, Streaming or Subscription |
| | priceRetail | Decimal | Retail price for the offer. |
| | priceWholesale | Decimal | Wholesale price for the offer. This price may be the wholesale price for a Video, Video Instance, a TV Series, or a TV Season, and it is |

| Element Name | Attribute Name | Data Type | Description |
|---|---|---|---|
| | | | depended on the associateElementType specific for the offer. |
| | startDateTime | DateTime | GMT date time that the offer becomes available |
| | endDateTime | DateTime | GMT date time that the offer expires |
| | territoryCode | Char(3) | Country code that the video is available for download The territoryCode is a 3-letter country code as derived from ISO 3166 |
| Promotion | corporateCode | Char(100) | Content Provider Corporate ID Promotion Info |
| | promotionDisplayText | Char(500) | Internal Use only |
| | promotionCode | Char(25) | Internal Use only |
| | promotionPRice | Decimal | Internal Use only |
| | promotionStartDateTime | DateTime | Internal Use only |
| | promotionEndDateTime | DateTime | Internal Use only |
| AssociateElChildElment | | | This is only applicable to Season, Series offer in an embodiment. It includes a list of Video Instance element ID that the season or series offer is associated with. |
| | id | integer | Video Instance Element ID that the offer is associated with. For example, the HD version of a particular series Season 1 is going to sell for wholesale price $19.99. First, set the wholesale price to "19.99", then set the associateElementType to "TVSeasonHD", set the "AssociateElementID" to the Season ID of Season 1, and then add the list of Video Instance IDs for all HD episodes in Season 1 to the AssociateChildElement node |

SupplementaryFile Element
SupplementaryFile element enables provider to associate any supplementary files that are non-poster, non-trailer to the Video. Examples are: Screenshots for the video, licensing agreement files, attribution files etc.

| Element Name | Attribute Name | Data Type | Description |
|---|---|---|---|
| SupplementaryFile | | TSupplementaryFile | SupplementaryFile element enables provider to associate any supplementary files that are non-poster, non-trailer to a Video, Video Instance, TV Series, TV Season, Channel etc |
| | associateElementType | Enum | Type of element that the supplementary file is associated with. A supplementary file can be associated to a TV Series, TV season or a particular TV Episode or movie etc. |
| | associateElementId | Integer | Element ID that the supplementary file is associated with. The type of ID (whether it is a Series ID, Season ID, Video ID or Video Instance ID) is depended on the AssociateElementType. |

| Element Name | Attribute Name | Data Type | Description |
| --- | --- | --- | --- |
| | uuid | Integer | Partner assigned unique identifier for the supplementary file |
| | contentType | Enum | Enum defined by the service for the supported content type for supplementary file. |
| | fileType | Enum | Enum defined by the service for the supported file type for supplementary file. |
| | url | Char(1024) | URL of the supplementary file |
| | size | Integer | Size (in bytes) of the supplementary file |
| | durationSecs | Integer | For supplementary file that is in video format, this is run time of the physical video file. For non-video supplementary file, leave this blank |
| AudioFormat | | TAudioFormat | For supplementary file that is in video format, this element contains the Audio Format information for the video. For non-video supplementary file, leave out this element |
| VideoFormat | | TVideoFormat | For supplementary file that is in video format, this element contains the Video Format information for the video. For non-video supplementary file, leave out this element |
| ImageFormat | | TImageFormt | For supplementary file that is image, this element contains the Image Format information. For non-image supplementary file, leave out this element |
| Hash | | THash | Hash |
| | type | Char(100) | Hash type. By default, it's MD5 |
| | value | Char(100) | Hash value |

Category Element

Category contains categories/genre information for Video content. You can associate multiple categories to a Video. For example, for a Video that is "Romantic Comedy", you can associate two Category IDs to it—"Romance" and "Comedy".

| Element Name | Attribute Name | Data Type | Description |
| --- | --- | --- | --- |
| Category | | TCategoryRef | Video category/genre. Category is defined into 2 level. A video can associate to first level, second level or both. A video can also be associated with multiple categories. |
| | id | Integer | Unique Category ID assigned by the service. |

Role Element

Role contains the cast and character information for the video.

| Element Name | Attribute Name | Data Type | Description |
| --- | --- | --- | --- |
| Role | | TRole | |
| | roleID | Integer | Unique ID assigned by the service for the Role. |
| | contributorID | Integer | Partner assigned unique ID for the contributor. This ID should maps in the ID defined in the Contributor element node |
| | character | Char(50) | Name of the character |
| | ranking | Integer | Role ranking in ascending order, where 1 being the most important Role in the video |

Flag Element

Flag contains attribute information associated with the video.

| Element Name | Attribute Name | Data Type | Description |
| --- | --- | --- | --- |
| Flag | | TFlagRef | Attribute associates with the video. |
| | ID | Integer | Unique ID assigned by the service for the Video Flag. |

Rating Element

Rating contains parental rating information associated with the video. Multiple ratings can be associated to a given video

| Element Name | Attribute Name | Data Type | Description |
| --- | --- | --- | --- |
| Rating | | TRating | Rating associates with the video. |
| | RatingValueID | Integer | Rating Value ID assigned by the service. |

-continued

| Element Name | Attribute Name | Data Type | Description |
|---|---|---|---|
| | RatingDescriptorID | Integer | Rating Descriptor ID assigned by the service. |

Contributor Element
Contributor contains the actor/actress/cast info.

| Element Name | Attribute Name | Data Type | Description |
|---|---|---|---|
| Contributor | | TContributor | Contributor is a human being or animal who makes contribution to the video content. Examples are actor, actresses, writer, producer or director. |
| | id | Integer | Partner assigned unique identifier for the contributor. This ID should uniquely identify a contributor, and should not be changed or recycled to assign to a different contributor. |
| | fName | Char(50) | First name of the contributor. If the contributor is an animal, this is the name of the animal |
| | mName | Char(50) | Middle name of the contributor |
| | lName | Char(50) | Last name of the contributor |
| | prefix | Char(50) | Prefix for the contributor. |
| | suffix | Char(50) | Suffix for the contributor. |

VChannel Element
VChannel is the Virtual video channel, it can be a traditional network channel or a virtual channel defined by provider.

| Element Name | Attribute Name | Data Type | Description |
|---|---|---|---|
| VChannel | | TVChannel | Virtual video channel. Virtual video channel can be a traditional network channel or a virtual channel defined by provider |
| | id | Integer | Partner assigned unique identifier for the virtual video channel. This ID should uniquely identify a video channel, and should not be changed or recycled to assign to a different virtual channel. |
| | title | Char(50) | Full display name for the Virtual Video channel |
| | reducedTitle | Char(20) | Short display name for the Virtual Video channel |
| | desc | Char(4000) | Full description for the Virtual Video channel |
| | reducedDesc | Char(1000) | Short description for the Virtual Video channel |
| NetworkLogo | | TNetworkLogo | Network Logo Data |
| | url | Char(1024) | URL of the Network Logo image file |
| | size | Integer | Size (in bytes) of the image file |
| ImageFormat | | TImageFormat | Image Format information for the video. |
| Video | | TVideoRef | Define a list of videos available in this channel |
| | VideoID | Integer | Partner assigned unique ID for the video. This ID should maps in the ID defined in the VideoList element node |

Marker Element
Marker contains position information on inserting ads. It is used in Ad-sponsored Video content.

| Element Name | Attribute Name | Data Type | Description |
|---|---|---|---|
| Marker | | TMarker | Position to insert Ads |
| | name | Char(100) | Marker name |

-continued

| Element Name | Attribute Name | Data Type | Description |
|---|---|---|---|
| | type | Char(100) | Marker type |
| | startMillis | Long | Start millisecond |
| | durationMillis | Long | Duration in millisecond |

Tag Element

Tag defines a list of "keyword" associate with the video, and is used to facilitate search.

| Element Name | Attribute Name | Data Type | Description |
|---|---|---|---|
| Tag | | TTag | Tag |
| | namespace | | Tag namespace |

AdGroup Element

AdGroup contains the ad information for Ad-sponsored Video content.

| Element Name | Attribute Name | Data Type | Description |
|---|---|---|---|
| AdGroup | | TAdGroup | Ad group information |
| | id | Integer | Ad Group ID |
| | Manifest Url | Char(1024) | Ad Group Manifest Url |

Video Type

| Video Type ID | Video Type |
|---|---|
| 1 | Movie |
| 2 | TV Episode in a Limited Series |
| 3 | TV Episode in a Mini-Series |
| 4 | TV Episode in a Serial |
| 5 | TV Episode in a Series |
| 6 | Short Film |
| 7 | Special |
| 8 | Video Podcast |
| 9 | Movie Trailer |
| 10 | Music Video |
| 11 | Sporting Event |
| 12 | User Generated Content/Video |
| 13 | Music Video Sample Clip |
| 14 | TV Promo Sample Clip |
| 15 | Other Promo Content Clip |
| 16 | Games Trailer |
| 17 | Audio Podcast |

Audio Encoding Type

| Enumerated Type | Description |
|---|---|
| WMA | WMA |
| Dolby | Dolby |
| Dolby Digital | Dolby Digital |
| DTS | DTS (DTS Coherent Acoustics) |
| MP3 | MP3 |

Definition Format Type

| Enumerated Type | Description |
|---|---|
| SD | Standard Definition |
| HD | High-Def |
| XD | XD |
| ED | Enhanced Definition |

Aspect Ratio Type

| Enumerated Type | Description |
|---|---|
| 4:3 | 4:3 (Standard) |
| 16:9 | 16:9 (High-Def) |
| 1:37:1 | 1:37:1 |
| 2:39:1 | 2:39:1 |
| 1:37:1 | 1:37:1 |
| 1:85:1 | 1:85:1 |

Video Encoding Type

| Enumerated Type | Description |
|---|---|
| WMV | WMV |
| WMV HD | WMV HD |
| MPEG-4ASP | MPEG-4 ASP Video (3ivx, DivC, XviD) Digital) |
| H.264 | MPEG-4 AVC (H.264, MainConcept, Nero Digital, QuickTime H.264, Sorenson AVC Pro codec, Vanguard Software Solutions, x264) |
| MPEG-1 | MPEG-1 Video |
| MPEG-2 | MPEG-2 Video |
| ASF | ASF |
| WAX | WAX |
| RealVideo | RealVideo |

Download Type

| Enumerated Type | Description |
|---|---|
| Stream | Stream |
| Download | Download |
| Progressive DL | Progressive DL |

Image Type

| Enumerated Type | Description |
|---|---|
| JPG | JPEG |
| GIF | GIF |
| PNG | PNG |
| TIF | TIF |

Associate Element Type

| Enumerated Type | Description |
|---|---|
| VideoInstance | Video Instance |
| Video | Video |
| TVSeason | TV Season, includes all episodes in a season, either in HD or SD or XD) |
| TVSeasonHD | TV Season, but only includes episodes that are in HD format |
| TVSeasonSD | TV Season, but only includes episodes that are in SD format |
| TVSeasonXD | TV Season, but only includes episodes that are in XD format |
| TVSeries | TV Series, includes all episodes in a series, either in HD or SD or XD |
| TVSeriesHD | TV Series,, but only includes episodes that are in HD format |

-continued

| Enumerated Type | Description |
|---|---|
| TVSeriesSD | TV Series,, but only includes episodes that are in SD format |
| TVSeriesXD | TV Series,, but only includes episodes that are in XD format |
| VChannel | Virtual Channel |
| VideoGroup | Video Group |
| Contributor | Contributor |

Supplementary Content Type

| Enumerated Type | Description |
|---|---|
| ScreenShot | Screen Shot |
| Attribution | Attribution |
| Licensing | Licensing |

Supplementary File Type

| Enumerated Type | Description |
|---|---|
| ImageFile | ImageFile |
| VideoFile | VideoFile |
| HTML | HTML |
| XML | XML |

Category ID

| Main Category | | SubCategory | |
|---|---|---|---|
| ID | Name | ID | Name |
| 100 | General | | |
| | | 101 | All |
| | | 102 | Action/Adventure |
| | | 103 | Comedy |
| | | 104 | Documentary/Bio |
| | | 105 | Drama |
| | | 106 | Educational |
| | | 107 | Family/Children |
| | | 108 | Movies |
| | | 109 | Music |
| | | 110 | News |
| | | 111 | Sci-Fi/Fantasy |
| | | 112 | Soap |
| | | 113 | Sports |
| | | 114 | Other |
| 200 | Educational | | |
| | | 201 | All |
| | | 202 | Arts |
| | | 203 | Biography |
| | | 204 | Documentary |
| | | 205 | How-to |
| | | 206 | Science |
| | | 207 | Other |
| 300 | Kids | | |
| | | 301 | All |
| | | 302 | Adventure |
| | | 303 | Animated |
| | | 304 | Comedy |
| | | 305 | Educational |
| | | 306 | Special |
| | | 307 | Other |
| 400 | Lifestyle | | |
| | | 401 | All |
| | | 403 | Collectibles |
| | | 404 | Cooking |
| | | 405 | Exercise |
| | | 406 | Health |
| | | 407 | Home and Garden |
| | | 408 | Outdoors |
| | | 409 | Religious |
| | | 410 | Other |
| 500 | Movies | | |
| | | 501 | All |
| | | 502 | Action |
| | | 504 | Adventure |
| | | 505 | Avant-garde/Experimental |
| | | 506 | Business |
| | | 507 | Children's/Family |
| | | 508 | Comedy |
| | | 509 | Comedy Drama |
| | | 510 | Crime |
| | | 511 | Culture & Society |
| | | 512 | Dance |
| | | 513 | Drama |
| | | 514 | Education |
| | | 515 | Epic |
| | | 516 | Family & Personal Relationships |
| | | 517 | Fantasy |
| | | 518 | Film, TV & Radio |
| | | 519 | Health & Fitness |
| | | 520 | Historical Film |
| | | 521 | History |
| | | 522 | Horror |
| | | 523 | Language & Literature |
| | | 524 | Leisure Arts |
| | | 525 | Music |
| | | 526 | Musical |
| | | 527 | Mystery |
| | | 528 | Nature |
| | | 529 | Romance |
| | | 530 | Science & Technology |
| | | 531 | Science Fiction |
| | | 532 | Spirituality & Philosophy |
| | | 533 | Sports & Recreation |
| | | 534 | Spy Film |
| | | 535 | Theater |
| | | 536 | Thriller |
| | | 537 | Travel |
| | | 538 | Visual Arts |
| | | 539 | War |
| | | 540 | Western |
| 600 | News | | |
| | | 601 | All |
| | | 602 | Business |
| | | 603 | Current Events |
| | | 604 | Interview |
| | | 605 | Public Affairs |
| | | 606 | Sports |
| | | 607 | Weather |
| | | 608 | Other |
| 700 | Series | | |
| | | 701 | All |
| | | 702 | Action/Adventure |
| | | 703 | Children |
| | | 704 | Comedy |
| | | 705 | Cooking |
| | | 706 | Drama |
| | | 707 | Educational |
| | | 708 | Game Show |
| | | 709 | How-to |
| | | 710 | Music |
| | | 711 | Reality |
| | | 712 | Soap Opera |
| | | 713 | Talk Show |
| | | 714 | Travel |
| | | 715 | Other |
| 800 | Special | | |
| | | 801 | All |
| | | 802 | Awards/Event |
| | | 803 | Holiday |
| | | 804 | Music |
| | | 805 | Religious |
| | | 806 | Sports |
| | | 807 | Other |

| Main Category | | SubCategory | |
|---|---|---|---|
| ID | Name | ID | Name |
| 900 | Sports | | |
| | | 901 | All |
| | | 902 | Baseball |
| | | 903 | Basketball |
| | | 904 | Boxing |
| | | 905 | Football |
| | | 906 | Golf |
| | | 907 | Hockey |
| | | 908 | Outdoor |
| | | 909 | Racing |
| | | 910 | Soccer |
| | | 911 | Tennis |
| | | 912 | Other |
| 1000 | Clips | | |
| | | 1001 | UGC |
| | | 1002 | Promo Content—TV |
| | | 1003 | Promo Content—Movie |
| | | 1004 | Promo Content |
| 1100 | Music Video | | |
| | | 1101 | Blues |
| | | 1102 | Jazz |
| | | 1103 | Latin |
| | | 1104 | Metal |
| | | 1105 | New Age |
| | | 1106 | Oldies |
| | | 1107 | Other |
| | | 1108 | Pop |
| | | 1109 | Rap & Hip-Hop |
| | | 1110 | Reggae |
| | | 1111 | Religious |
| | | 1112 | Rock |
| | | 1113 | Soul and RB |
| | | 1114 | Soundtracks |
| | | 1115 | Spoken |
| | | 1116 | Vocal |
| | | 1117 | World |
| | | 1118 | Children |
| | | 1119 | Classical |
| | | 1120 | Comedy |
| | | 1121 | Country |
| | | 1122 | Dance |
| | | 1123 | Easy Listening |
| | | 1124 | Electronica |
| | | 1125 | Folk |
| | | 1126 | Holiday |

Role ID

| Role ID | Role Name |
|---|---|
| 1 | Actor |
| 2 | Director |
| 3 | Guest Star |
| 4 | Host |
| 5 | Producer |
| 6 | Writer |
| 7 | Arranger |
| 8 | Artist |
| 9 | Composer |
| 10 | Conductor |
| 11 | Contributing Artist |
| 12 | Director of Photography |
| 13 | Editor |
| 14 | Engineer |
| 15 | Ensemble/Orchestra |
| 16 | Executive Producer |
| 17 | Guest Artist |
| 18 | Hair and Make Up |
| 19 | Mixer |
| 20 | Performer |
| 21 | Post Production Effects |
| 22 | Production Designer |
| 23 | Soloist |
| 24 | Wardrobe Stylist |

Flag ID

| Flag ID | Video Flag Attribute |
|---|---|
| 1 | Premiere |
| 2 | Season Premiere |
| 3 | Series Premiere |
| 4 | Finale |
| 5 | Season Finale |
| 6 | Series Finale |

Rating Type ID

| Rating Type Rating ID | Rating Type | | | |
|---|---|---|---|---|
| 100 | MPAA Rating | | | |
| | Rating | Rating ID | rank | value |
| | | 101 | 1 | G |
| | | 102 | 2 | PG |
| | | 103 | 3 | PG-13 |
| | | 104 | 4 | R |
| | | 105 | 5 | NC-17 |
| | | 106 | 6 | X |
| | | 107 | 7 | NR |
| | | 108 | 8 | AO |
| | Descriptor | Rating ID | name | |
| | | 10001 | Adult Situations | |
| | | 10002 | Brief Nudity | |
| | | 10003 | Graphic Language | |
| | | 10004 | Graphic Violence | |
| | | 10005 | Language | |
| | | 10006 | Mild Violence | |
| | | 10007 | Nudity | |
| | | 10008 | Rape | |
| | | 10009 | Strong Sexual Content | |
| | | 10010 | Violence | |
| 200 | Star Rating | | | |
| | Rating | Rating ID | rank | value |
| | | 201 | 1 | 0 |
| | | 202 | 2 | 0H |
| | | 203 | 3 | 1 |
| | | 204 | 4 | 1H |
| | | 205 | 5 | 2 |
| | | 206 | 6 | 2H |
| | | 207 | 7 | 3 |
| | | 208 | 8 | 3H |
| | | 209 | 9 | 4 |
| 300 | US Television Rating | | | |
| | Rating | Rating ID | rank | value |
| | | 301 | 1 | TV-G |
| | | 302 | 2 | TV-14 |
| | | 303 | 3 | TV-MA |
| | | 304 | 4 | TV-Y |
| | | 305 | 5 | TV-Y7 |

-continued

| Rating Type Rating ID | Rating Type | | Rating ID | rank | value |
|---|---|---|---|---|---|
| 400 | UK Television Rating Rating | | | | |
| | | | 401 | 1 | U |
| | | | 402 | 2 | UC |
| | | | 403 | 3 | PG |
| | | | 404 | 4 | 12 |
| | | | 405 | 5 | 15 |
| | | | 406 | 5 | 18 |
| | | | 407 | 6 | R18 |
| 500 | KR Television Rating Rating | | | | |
| | | | Rating ID | rank | value |
| | | | 501 | 1 | ALL |
| | | | 502 | 2 | SEVEN |
| | | | 503 | 3 | TWELVE |
| | | | 504 | 4 | FIFTEEN |
| | | | 505 | 5 | NINETEEN |
| 600 | Canada Television Rating Rating | | | | |
| | | | Rating ID | rank | value |
| | | | 601 | 1 | 18+ |
| | | | 602 | 2 | 14+ |
| | | | 603 | 3 | PG |
| | | | 604 | 4 | G |
| | | | 605 | 5 | C8 |
| | | | 606 | 6 | C |
| 700 | DE Television Rating Rating | | | | |
| | | | Rating ID | rank | value |
| | | | 701 | 1 | ALL |
| | | | 702 | 2 | SIX |
| | | | 703 | 3 | TWELVE |
| | | | 704 | 4 | SIXTEEN |
| | | | 705 | 5 | ADULTS |
| 800 | FR Television Rating Rating | | | | |
| | | | Rating ID | rank | value |
| | | | 801 | 1 | CAT1 |
| | | | 802 | 2 | CAT2 |
| | | | 803 | 3 | CAT3 |
| | | | 804 | 4 | CAT4 |
| | | | 805 | 5 | CAT5 |
| 900 | Explicit Language Rating | | | | |
| | | | Rating ID | rank | value |
| | | | 901 | 1 | Restrict |
| | | | 902 | 2 | Clean |

What is claimed is:

1. A computerized method executable by a processor for providing a catalog of media files, said method comprising:
   receiving a plurality of source collections from a plurality of content providers, each of said source collections comprising a plurality of media files and metadata associated therewith available from at least one corresponding content provider, wherein a subset of the media files from different content providers has similar content, and wherein a subset of the metadata from the different content providers has non-identical content;
   combining the received source collections and rendering a destination collection based on an interlinking rule between elements received from the plurality of source collections;
   receiving a selection of one of the media files of the subset of media files having similar content and;
   updating the interlinking rule based on the received selection;
   wherein combined metadata is generated based on the interlinking rule, said metadata mapping the combined source collection elements received from the plurality of source collections; and
   wherein a user catalog is generated from the destination collection in a pre-defined catalog format for consumption by a user via a client computer, said user catalog including the selected media file and further including, associated with the selected media file, the combined metadata.

2. The computerized method of claim 1, wherein receiving the source collections comprises importing and loading a data feed from each of the plurality of content providers.

3. The computerized method of claim 1, further comprising defining the catalog format according to a multi-field schema and wherein combining the received source collections includes parsing the catalog data received from the plurality of content providers and assigning the parsed catalog data to one or more fields of the multi-field schema.

4. The computerized method of claim 1, wherein the catalog format comprises an action type for catalog data received from each of the content providers, and wherein the action type comprises one or more of the following: add, edit, and delete.

5. The computerized method of claim 1, wherein the user catalog is generated by propagating the user catalog to a front end database for access by the network interface.

6. The computerized method of claim 1, wherein the processor is further configured for periodically updating the user catalog based on at least a portion of the generated user catalog.

7. The computerized method of claim 1, wherein one or more computer-readable storage media have computer executable instructions for performing the method recited in claim 1.

8. A computerized method executable by a processor of a catalog service for providing a catalog of media files, said method comprising:
   receiving a plurality of source collections from a plurality of content providers, each of said source collections comprising a plurality of media files and metadata associated therewith available from at least one corresponding content provider, wherein a subset of the media files from different content providers has similar content, and wherein a subset of the metadata from the different content providers has non-identical content;
   collection level interlinking the plurality of received source collections into a destination collection based on one or more of a source collection count of the plurality of received source collections and a specified destination collection count of the destination collection;
   generating metadata comprising newly combined metadata to reference the collection level interlinked source collection, said newly combined metadata comprising merged metadata items and mapping the interlinked source collections, and wherein the newly combined metadata is generated based on evaluating the metadata of each file of the plurality of media files in the collection level interlinked plurality of received source collections;
   generating a user catalog from the destination collection in a pre-defined catalog format for consumption by a user via a client computer, said user catalog including the combined metadata of the interlinked source collections; and transmitting at least a portion of the generated user catalog to the client computer.

9. The computerized method of claim 8, wherein receiving the source collections comprises importing and loading a data feed from each of the plurality of content providers.

10. The computerized method of claim 8, further comprising defining the catalog format according to a multi-field schema and wherein the collection level interlinking includes parsing the catalog data received from the plurality of content providers and assigning the parsed catalog data to one or more fields of the multi-field schema.

11. The computerized method of claim 8, wherein the catalog format comprises an action type for catalog data received from each of the content providers, and wherein the action type comprises one or more of the following: add, edit, and delete.

12. The computerized method of claim 8, wherein the processor is further configured for providing a network interface for delivering the generated user catalog to the client computer.

13. The computerized method of claim 12, wherein generating the user catalog comprises propagating the user catalog to a front end database for access by the network interface.

14. The computerized method of claim 8, wherein the processor is further configured for periodically updating the user catalog by transmitting a portion of the generated user catalog to the client computer.

15. The computerized method of claim 8, wherein one or more computer-readable storage media have computer executable instructions for performing the method recited in claim 8.

16. A computerized method executable by a processor for selecting from a received catalog of media files, said method comprising:

receiving a display of media files as a combined destination collection, said combined destination collection representing a plurality of source collections from a plurality of content providers, each of said source collections comprising a plurality of media files and metadata associated therewith available from at least one corresponding content provider, said combined destination collection further comprising combined metadata, said metadata mapping the plurality of media files received from the plurality of source collections;

selecting, from the received display, at least one of the media files from a subset of media files having similar content; and receiving a transmission of at least a portion of a user catalog, said user catalog being generated from the destination collection based on an updated interlinking rule defined by the selecting from the received display, said user catalog being generated in a pre-defined catalog format for consumption by a user via a client computer, said user catalog including the selected at least one of the media files and further including the metadata comprising newly combined metadata associated therewith, said newly combined metadata comprising merged metadata items and mapping the interlinked source collections to the user catalog using the merged metadata items, and wherein the newly combined metadata is generated based on evaluating the metadata of each file of the plurality of media files in the combined plurality of received source collections.

17. The computerized method of claim 16, further comprising receiving rendered content in response to a user selection from the user catalog.

18. The computerized method of claim 17, further comprising receiving a catalog format defined according to a multi-field schema.

19. The computerized method of claim 18, wherein the received catalog format comprises an action type for catalog data received from each of the content providers, and wherein the action type comprises one or more of the following: add, edit, and delete.

* * * * *